(12) United States Patent
Chiu et al.

(10) Patent No.: US 10,241,595 B2
(45) Date of Patent: Mar. 26, 2019

(54) ELECTRONIC PEN AND POSITION DETECTION SYSTEM

(71) Applicant: Wacom Co., Ltd., Saitama (JP)

(72) Inventors: Kuan-her Chiu, Hsinchu (TW); Ming-shen Sun, Hsinchu (TW); Naoto Onoda, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 132 days.

(21) Appl. No.: 15/449,608

(22) Filed: Mar. 3, 2017

(65) Prior Publication Data

US 2017/0277286 A1 Sep. 28, 2017

(30) Foreign Application Priority Data

Mar. 28, 2016 (JP) ................. 2016-063278

(51) Int. Cl.
*G06F 3/038* (2013.01)
*G06F 3/041* (2006.01)
*G06F 3/0346* (2013.01)
*G06F 3/0354* (2013.01)

(52) U.S. Cl.
CPC ........ *G06F 3/03545* (2013.01); *G06F 3/0346* (2013.01); *G06F 3/0383* (2013.01); *G06F 3/041* (2013.01); *G06F 2203/04105* (2013.01)

(58) Field of Classification Search
CPC .. G06F 3/03545; G06F 3/0383; G06F 3/0346; G06F 3/041
See application file for complete search history.

(56) References Cited

U.S. PATENT DOCUMENTS

| 7,161,578 | B1 | 1/2007 | Schneider | |
|---|---|---|---|---|
| 8,648,837 | B1 | 2/2014 | Tran et al. | |
| 2014/0002422 | A1 | 1/2014 | Stern et al. | |
| 2014/0028635 | A1* | 1/2014 | Krah | G06F 3/041 345/179 |
| 2016/0334884 | A1* | 11/2016 | Solomon | G06F 3/0304 |

* cited by examiner

*Primary Examiner* — Kevin M Nguyen
(74) *Attorney, Agent, or Firm* — Seed IP Law Group LLP

(57) ABSTRACT

An electronic pen is readily provided with an expanded function and remains easy to use without complicated power supply management. An electronic pen body implementing an electronic pen function is connected with an expansion device implementing a laser pointer function via a connector jack and a connector plug. A chargeable battery mounted in the electronic pen body keeps the center of gravity of the body low and is arranged to feed power to the expansion device. A control circuit of the electronic pen body suitably controls the supply of power from the battery to the expansion device in accordance with a status of use of the electronic pen body and of the battery. A switch of the expansion device is operated to emit a laser beam.

11 Claims, 9 Drawing Sheets

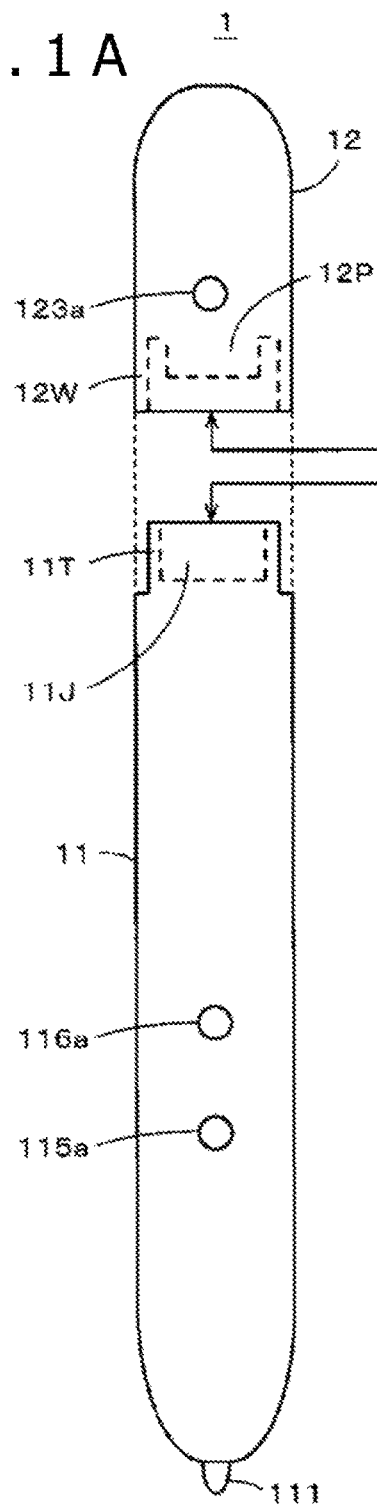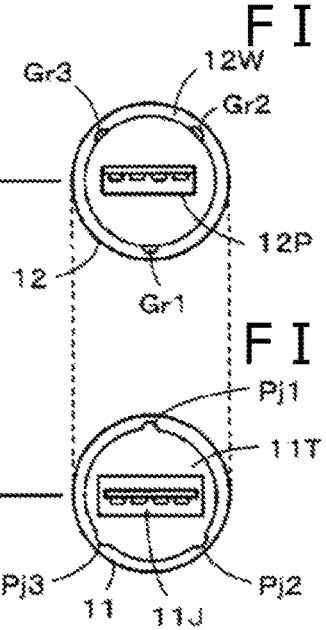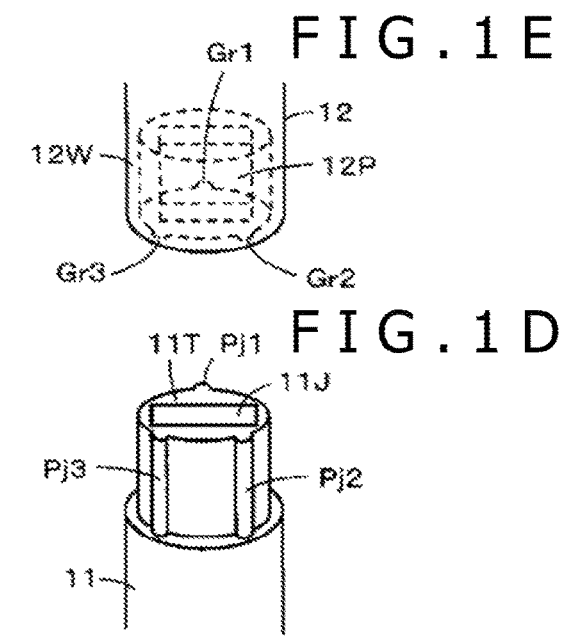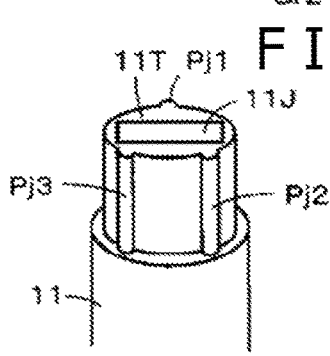

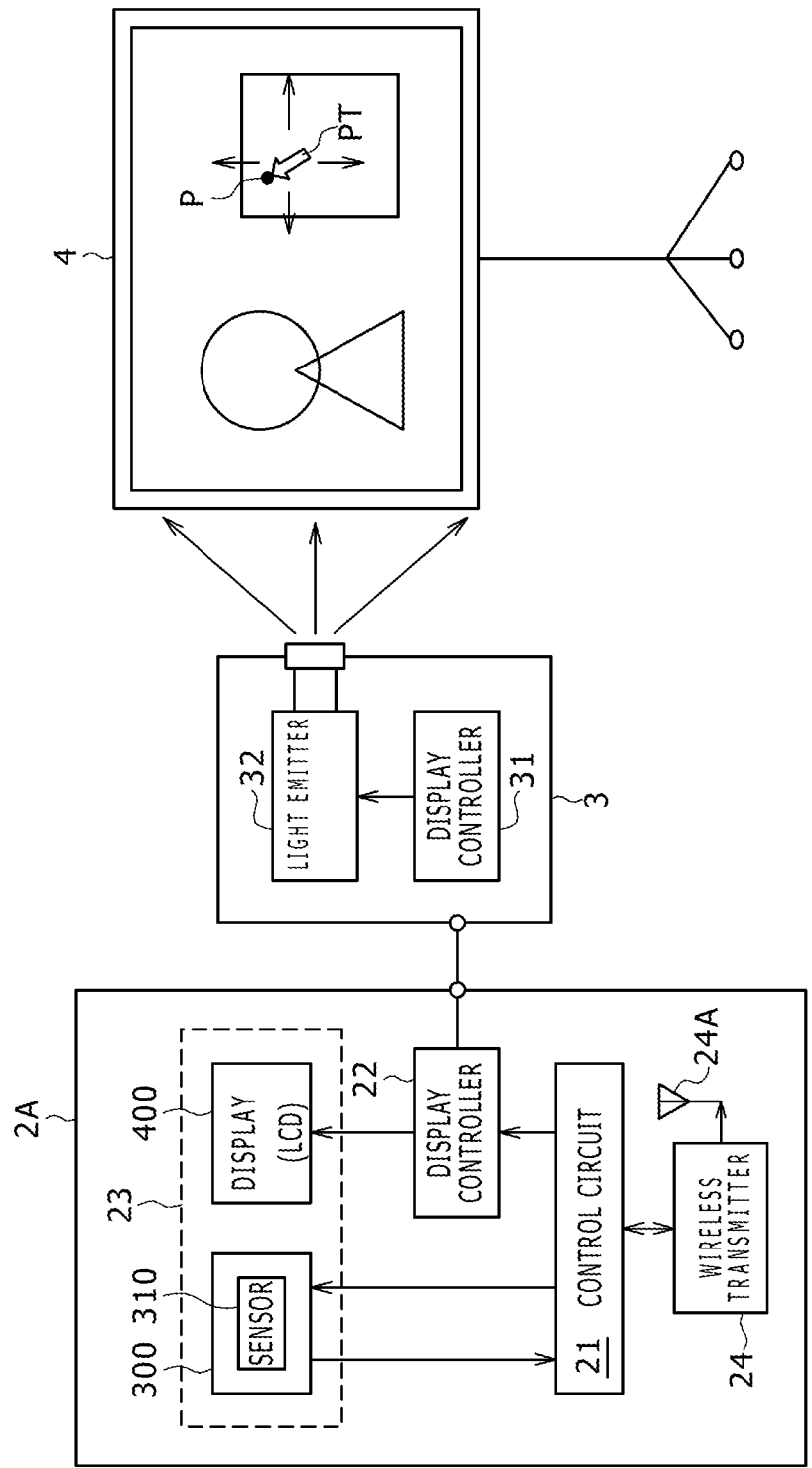

PROCESSING OF ELECTRONIC PEN 1A

PROCESSING OF PC 2A

ELECTRONIC PEN AND POSITION DETECTION SYSTEM

BACKGROUND

1. Technical Field

The present disclosure relates to an electronic pen acting as a position designator designating a position to a position detection circuit, and a position detection system made up of the electronic pen and a device that includes the position detection circuit.

2. Description of the Related Art

A large number of information terminals such as tablet personal computers (PC) each equipped with a touch panel are commercially available today. The touch panel is an electronic component that combines a display unit such as a liquid crystal display with a position detection circuit that uses a touch sensor (coordinate detection sensor). When touched by finger of an operator, the touch panel permits diverse input operations. Where more detailed input operations are needed, an electronic pen is often used as a dedicated position designator. A device called a digitizer is also used extensively today. The device acts as an input device for the PC and is made up of a board that incorporates a touch sensor for position detection and an electronic pen that designates positions.

In conferences, meetings, and seminars, it is now practice to display necessary information on a screen using an information terminal and a projector, the information terminal permitting simple and quick input of information using an input device that incorporates touch sensor technology. The information terminal and the projector enable the screen to display prepared materials as well as information that may be added on the spot using the electronic pen so that the displayed information may be shared easily by all the participants at the gathering. The electronic pen may be expanded with additional functions such as a laser pointer function. The electronic pen with its laser pointer function may then be used to point to and explain the information that is projected onto the screen after being input through the information terminal using the electronic pen.

Expansion of the electronic pen with additional features such as the laser pointer function is often accomplished by putting the expanded function into a unit that is attached to the rear end of the electronic pen (opposite end to the stylus), with the electronic pen body left unchanged structurally. That is, the expanded function is configured to be housed in an enclosure separate from and attachable to the electronic pen (i.e., offered as a separate unit). When attached to the electronic pen, the separate unit provides the pen with the expanded function in a simplified manner. The techniques for incorporating the expanded function such as the laser pointer function into the electronic pen are disclosed, for example, in U.S. Patent Application Publications Nos. 2014/0028635 and 2014/0002422, and U.S. Pat. No. 7,161,578.

There are two types of electronic pen: signal oscillation type and resonance type. The signal oscillation type of electronic pen causes an oscillation circuit in the electronic pen to oscillate and transmit signals for position detection. The resonance type of electronic pen allows a resonance circuit in the electronic pen to resonate with an external magnetic field coming from a position detection circuit and to reflect signals to that circuit for position detection. The resonance type of electronic pen may store drive power inside the electronic pen by means of a resonance action with the external magnetic field. The signal oscillation type of electronic pen, by contrast, needs to have a power supply in the electronic pen to drive an oscillator and other parts.

A power supply also needs to be installed in the expanded function unit attached to the electronic pen. For example, if the expanded function is a laser pointer, relatively large power is needed to drive a semiconductor laser in the pointer. That means the power supply such as a primary or secondary battery needs to be mounted in the laser pointer. However, if the power supply is included in the expanded function unit attached to the rear end of the electronic pen, the center of gravity is shifted toward the rear end of the electronic pen. The shifted center of gravity may prevent the writer's writing pressure from being suitably propagated to a stylus of the electronic pen, causing the writer to have difficulty writing.

The signal oscillation type of electronic pen needs two power supplies: one in the electronic pen and the other in the expansion device. If the power supply of the electronic pen is exhausted, the electronic pen function cannot be used while the expanded function is still usable. That means the user is required always to manage the power supplies in both the electronic pen and the expanded function. If primary batteries are used as the power supplies, both the electronic pen and the expansion device need to be structured to let their primary batteries be replaced. This may put structural constraints on these devices.

Furthermore, the expansion device is equipped with an operation switch while the electronic pen to be connected with the unit has a cylindrical enclosure. It follows that operating the switch applies pressing force perpendicularly to the axial direction of the cylindrical electronic pen. This can overburden a connector between the electronic pen and the expansion device, rendering the connector liable to break.

BRIEF SUMMARY

The present disclosure has been made in view of the above circumstances and provides an electronic pen acting as a position designator to which an expanded function is readily added in such a manner that the electronic pen remains easy to use without requiring complicated power supply management, the electronic pen and an expansion device implementing the expanded function being configured to protect a connector therebetween when connected to each other.

In carrying out the present disclosure and according to a first embodiment thereof, there is provided an electronic pen including an electronic pen body and an expansion device. The electronic pen body includes a first position designator configured to transmit a signal to a position detection sensor, a controller, a first connector, and an internal power supply configured to be charged from an external power supply via the first connector. The expansion device includes a second position designator configured to designate a position in a specific area different from an input area of the position detection sensor, an operator input circuit configured to receive an operation performed by a user, and a second connector. The electronic pen body and the expansion device are attachable to and detachable from each other via the first connector and the second connector. When the electronic pen body and the expansion device are connected to each other, the power supply part of the electronic pen body is enabled to feed power to the expansion device. The controller of the electronic pen body controls the supply of power from the power supply part of the electronic pen body to the expansion device. When the operator input circuit is operated, the controller transmits an instruction from the second position designator.

With the electronic pen according to the first embodiment outlined above, the electronic pen body having the first position designator and the expansion device having the second position designator are configured to be attachable to and detachable from each other by means of the first connector of the electronic pen body and the second connector of the expansion device. The first position designator of the electronic pen body transmits a signal to the position detection sensor located near the user. That is, the first position designator designates the position of what may be called a nearby object.

On the other hand, the second position designator of the expansion device designates the position in a specific area different from the input area of the position detection sensor. For example, the second position designator designates the position in a specific area on a screen located farther than the position detection sensor, i.e., the position of what may be called a faraway object. In this case, the operator input circuit of the expansion device may be operated to transmit an instruction from the second position designator to designate the position of the faraway object. In this manner, the electronic pen body for designating the position of the nearby object is readily equipped with the expansion device for designating the position of the faraway object.

The internal power supply is provided only in the electronic pen body and not located at the rear end of the electronic pen body. This makes the center of gravity of the electronic pen body low and keeps the electronic pen body easy to use. The internal power supply of the electronic pen body is charged from an external power supply via the first connector. When the electronic pen body and the expansion device are connected to each other via the first and the second connectors, the internal power supply of the electronic pen body is enabled to feed power to the expansion device. In this case, the controller of the electronic pen body controls the supply of power from the internal power supply of the electronic pen body to the expansion device. This avoids rendering power supply management of the electronic pen complicated.

According to a second embodiment of the present disclosure, there is provided an electronic pen including an electronic pen body and an expansion device. The electronic pen body includes a first position designator configured to transmit a signal to a position detection sensor, a controller, a first connector configured to have a recessed structure, a cylindrical body having the first connector formed therein, and an internal power supply configured to be charged from an external power supply via the first connector. The expansion device includes a second position designator configured to designate a position in a specific area different from an input area of the position detection sensor, an operator input circuit configured to receive an operation performed by a user, a second connector configured to have a protruding structure, and a wall surrounding the second connector. The electronic pen body and the expansion device are attachable to and detachable from each other via the first connector and the second connector. When the first connector and the second connector are connected to each other, the cylindrical part and the wall are interlocked with each other and the first connector and the second connector are covered protectively. When the electronic pen body and the expansion device are connected to each other, the internal power supply of the electronic pen body is enabled to feed power to the expansion device. The controller of the electronic pen body controls the supply of power from the internal power supply of the electronic pen body to the expansion device. When the operator input circuit is operated, the controller transmits an instruction from the second position designator.

The electronic pen according to the second embodiment outlined above has basically similar configuration as the electronic pen according to the first embodiment. In the case of the electronic pen according to the second embodiment, the first connector of the electronic pen body has a recessed structure, therefore the electronic pen body includes the cylindrical part having the first connector formed therein. On the other hand, the second connector of the expansion device has a protruding structure. The wall is provided a specific distance away from the second connector in a manner surrounding the second connector. The protruding second connector is inserted into the recessed first connector to connect the electronic pen body with the expansion device.

In the case above, the cylindrical part having the first connector formed therein has a thick wall to protect the first connector against easy breakage. When the second connector is inserted into the first connector to make a connection, the wall of the expansion device covers the cylindrical part of the electronic pen body to establish a strong interlock therebetween. That is, the thick-wall cylindrical part of the electronic pen body fits into a recessed portion between the second connector and the wall of the expansion device to connect the first connector with the second connector. This reinforces the connection between the electronic pen body and the expansion device. In this state, the cylindrical part of the electronic pen body and the wall of the expansion device cover the first and the second connectors being coupled to each other.

As outlined above, two interlocking parts are formed: the first connector of the electronic pen body and the second connector of the expansion device make up a first interlocking part, and the cylindrical part of the electronic pen body and the wall of the expansion device constitute a second interlocking part. The second interlocking part made up of the cylindrical part of the electronic pen body and the wall of the expansion device strongly protects the first interlocking part formed by the first connector of the electronic pen body and the second connector of the expansion device being connected to each other. Thus operating the operator input circuit of the expansion device does not overburden the first and the second connectors in their connected state and does not damage the first and the second connectors. The interlocking structure further ensures strong and stable connection between the electronic pen body and the expansion device.

The electronic pen according to the present disclosure is easy to expand with additional functions and still remains easy to use. The added functionality does not complicate power supply management.

The first and the second connectors in their connected state are protected in such a manner that they are not stressed when the operator input circuit of the expansion device is operated.

BRIEF DESCRIPTION OF THE DRAWINGS

FIGS. 1A, 1B, 1C, 1D, and 1E are views showing an external appearance of an electronic pen according to a first embodiment of the present disclosure;

FIG. 8 is a block diagram showing an example of a typical structure of a PC and a projector which, together with the electronic pen according to the second embodiment, make up a position detection system.

DETAILED DESCRIPTION OF THE PREFERRED EMBODIMENTS

Figure 2:
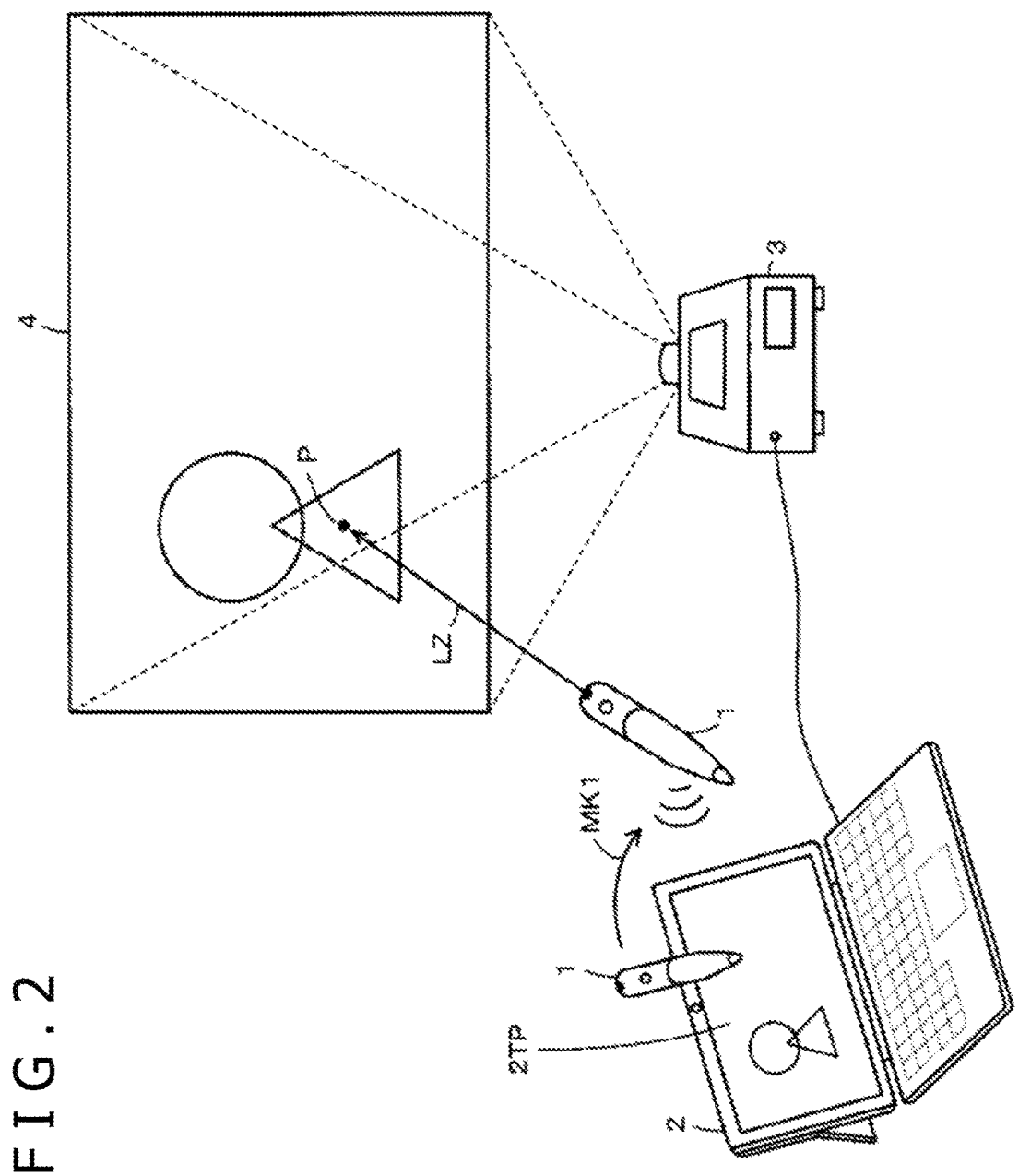
FIG. 2 is a view showing an example of how the electronic pen according to the first embodiment is typically used.

Some preferred embodiments of the electronic pen and the position detection system according to the present disclosure are described below with reference to the accompanying drawings.

First Embodiment (External Appearance of Electronic Pen 1)

FIGS. 1A, 1B, 1C, 1D, and 1E are views showing an example of an external appearance of an electronic pen 1 according to a first embodiment of the present disclosure. As shown in FIG. 1A, the electronic pen 1 according to the first embodiment is made up of an electronic pen body 11 and an expansion device 12. The electronic pen body 11 having a stylus 111 implements a signal oscillation type of electronic pen function that causes the stylus 111 to transmit signals oscillated inside the electronic pen body 11. For example, the electronic pen body 11 is used in conjunction with a capacitive coupling type of position detection circuit. The expansion device 12 implements a laser pointer function.

As shown in FIG. 1B, the rear end of the electronic pen body 11 (opposite end to the stylus 111) is furnished with a connector jack 11J. That is, as shown in FIG. 1D, the rear end of the electronic pen body 11 is provided with a cylindrical part 11T. A central portion of the cylindrical part 11T has the connector jack 11J of a recessed structure formed therein. The cylindrical part 11T accommodating the connector jack 11J has a thick wall against breakage that might occur when a connector plug is inserted into the connector jack 11J.

As shown in FIG. 1C, the end of the expansion device 12 facing the electronic pen body 11 is furnished with a connector plug 12P. The connector plug 12P of the expansion device 12 is inserted into and interlocked with the connector jack 11J of the electronic pen body 11. That is, as shown in FIG. 1E, the connector plug 12P of a protruding structure is provided at the end of the expansion device 12 facing the electronic pen body 11. A circular wall 12W is provided a specific distance away from the connector plug 12P in a manner surrounding the connector plug 12. The wall 12W has a certain thickness as shown in FIGS. 1A, 1C, and 1E. The outer circumference of the wall 12W coincides with the outer circumference of the electronic pen body 11. The inner circumference of the wall 12W is slightly larger than the outer circumference of the cylindrical part 11T of the electronic pen body 11.

In the above-described structure, the connector plug 12P of the expansion device 12 is inserted into the connector jack 11J of the electronic pen body 11 to establish an electrical connection between the electronic pen body 11 and the expansion device 12. As shown in FIGS. 1C and 1E, between the connector plug 12P and the wall 12W of the expansion device 12 is a recessed portion structured to accommodate the cylindrical part 11T of the electronic pen body 11. When the connector plug 12P of the expansion device 12 is inserted into the connector jack 11J of the electronic pen body 11, the cylindrical part 11T of the electronic pen body 11 fits into a gap between the connector plug 12P and the wall 12W of the expansion device 12. This maintains in a stronger and more stable manner the state of connection between the electronic pen body 11 and the expansion device 12.

The connector jack 11J of the electronic pen body 11 and the connector plug 12P of the expansion device 12 are thus configured to make up a first interlocking part. The cylindrical part 11T of the electronic pen body 11 and the wall 12W of the expansion device 12 constitute a second interlocking part. Thus when the electronic pen body 11 and the expansion device 12 are connected to each other, the connector jack 11J of the electronic pen body 11 and the connector plug 12P of the expansion device 12 in their connected state are covered circumferentially by the cylindrical part 11T of the electronic pen body 11 and by the wall 12W of the expansion device 12.

As shown in FIG. 1A, the cylindrical part 11T of the electronic pen body 11 and the wall 12W of the expansion device 12 have a specific height each (i.e., lengths in the axial direction of the electronic pen 1). This structure allows the cylindrical part 11T of the electronic pen body 11 and the wall 12W of the expansion device 12 to strongly protect both the connector jack 11J of the electronic pen body 11 and the connector plug 12P of the expansion device 12 in their connected state. Interconnected by the first and the second interlocking parts, the electronic pen body 11 and the expansion device 12 maintain their connected state in a strong and stable manner.

In the first embodiment, the connector jack 11J of the electronic pen body 11 and the connector plug 12P of the expansion device 12 may be a universal serial bus (USB) standard connector each. The USB standard connectors enable exchange of not only data but also power therebetween.

As described above, the electronic pen body 11 and the expansion device 12 are attached to and detached from each other by means of the connector jack 11J (first connector) and the connector plug 12P (second connector). That is, the expansion device 12 can be attached (connected) to and detached from the electronic pen body 11 easily. When the electronic pen body 11 and the expansion device 12 are connected to each other via the connector jack 11J and connector plug 12P, the electronic pen body 11 can supply power to the expansion device 12. As will be discussed later, a battery (secondary battery) is mounted in the electronic pen body 11. The secondary battery can be powered and charged from the outside via the connector jack 11J.

The side surface of the electronic pen body 11 is furnished with side switch operation parts (operation buttons) 115a and 116a. The side surface of the expansion device 12 is further provided with a laser beam on/off switch (operation button) 123a.

As described above, when the connector jack 11J of the electronic pen body 11 and the connector plug 12P of the expansion device 12 are connected to each other, these connectors are covered by the cylindrical part 11T of the electronic pen body 11 and by the wall 12W of the expansion device 12. In this structure, pressing the laser beam on/off switch 123a applies pressing force to the electronic pen 1 in a direction intersecting the axial direction of the electronic pen 1. However, the cylindrical part 11T of the electronic pen body 11 and the wall 12W of the expansion device 12 strongly protect the connector jack 11J of the electronic pen body 11 and the connector plug 12P of the expansion device 12 against the pressing force.

That is, the electronic pen body 11 will not be detached easily from the expansion device 12. Also, the connector jack 11J of the electronic pen body 11 and the connector plug 12P of the expansion device 12 will not be damaged easily in their connected state.

As shown in FIGS. 1B and 1D, the side wall (side surface) of the cylindrical part 11T of the electronic pen body 11 is furnished with projections Pj1, Pj2, and Pj3. And as shown in FIGS. 1C and 1E, the inner wall (inner surface) of the wall 12W in the expansion device 12 is provided with grooves Gr1, Gr2, and Gr3 in a manner coinciding with the projections Pj1, Pj2, and Pj3 of the cylindrical part 11T respectively.

The projections Pj1, Pj2, and Pj3 of the cylindrical part 11T and the grooves Gr1, Gr2, and Gr3 of the wall 12W determine the positions of the electronic pen body 11 and the expansion device 12 when they are connected to each other. The projections Pj1, Pj2, and Pj3 of the cylindrical part 11T and the grooves Gr1, Gr2, and Gr3 of the wall 12W allow the electronic pen body 11 and the expansion device 12 to be connected to each other always in a predetermined position. This protects the connector jack 11J and the connector plug 12P against being connected forcibly to each other in a reverse direction and damaged thereby.

Furthermore, interlocking the projections Pj1, Pj2, and Pj3 of the cylindrical part 11T with the grooves Gr1, Gr2, and Gr3 of the wall 12W prevents the electronic pen body 11 and the expansion device 12 from being turned in different directions from each other around their shaft center. That is, the projections Pj1, Pj2, and Pj3 of the cylindrical part 11T and the grooves Gr1, Gr2, and Gr3 of the wall 12W make up a third interlocking part. If external force is applied to the electronic pen body 11 and the expansion device 12 in an attempt to rotate them in different directions from each other around their shaft center, the third interlocking part serves to prevent propagation of the applied force as stress to the connector jack 11J and connector plug 12P being connected to each other. The connector jack 11J and the connector plug 12P are thus protected against breakage or malfunction if twisted forcibly.

In the electronic pen 1 of the first embodiment, as described above, the first, the second, and the third interlocking parts are formed between the electronic pen body 11 of the electronic pen 1 and the expansion device 12 for connection therebetween. The interlock ensures strong and stable connection between the electronic pen body 11 of the electronic pen 1 and the expansion device 12 while protecting them against failures including breakage.

It was explained above that in the first embodiment, the cylindrical part 11T is furnished with the three projections Pj1, Pj2, and Pj3 and the wall 12W is provided with the three grooves Gr1, Gr2, and Gr3. However, this is not limitative of the present disclosure. Alternatively, the cylindrical part 11T and the wall 12W may be provided with at least one projection and one groove corresponding to each other.

(Mode of Use of Electronic Pen 1)

FIG. 2 is a view showing an example of how the electronic pen 1 of the first embodiment is typically used. In FIG. 2, a personal computer (PC) 2 is mounted with a touch panel 2TP based on a capacitive coupling method. A projector 3 supplied with image data from the PC 2 projects an image reflecting the image data onto a screen 4. Thus when the stylus 111 of the electronic pen body 11 of the electronic pen 1 is brought into contact with and moved over the touch panel 2TP of the PC 2, information such as drawings, pictures, characters, and symbols is input to the PC 2. The information such as drawings, pictures, characters, and symbols input to the PC 2 is supplied to the projector 3 as the image data. The image reflecting the image data is then projected onto the screen 4 through the projector 3.

Suppose that a specific position in the image projected on the screen 4 is desired to be pointed to. In this case, as indicated by an arrow MK1 in FIG. 2, the electronic pen 1 is detached from the touch panel 2TP of the PC 2, and the expansion device 12 located at the opposite end of the stylus 111 is directed at the screen 4. Then pressing the switch 123a causes the expansion device 12 to emit a laser beam LZ toward the screen 4. In this manner, a position P on the screen 4 is pointed to by the laser beam LZ emitted from the expansion device 12. Changing the orientation of the expansion device 12 allows the desired position on the screen 4 to be pointed to by the laser beam LZ emitted from the expansion device 12.

When the electronic pen 1 is used as described above, it is possible to transition seamlessly between inputting information to the PC 2 using the electronic pen function and pointing to the desired position in the image projected on the screen 4 using the laser beam LZ. This facilitates explanations at conferences and meetings and thereby increases the benefits of the gatherings.

As described above, the electronic pen 1 of the first embodiment allows the expansion device 12 to be connected to the electronic pen body 11 to provide both the electronic pen function and the laser pointer function.

(Typical Structure of Electronic Pen 1)

Figure 3:
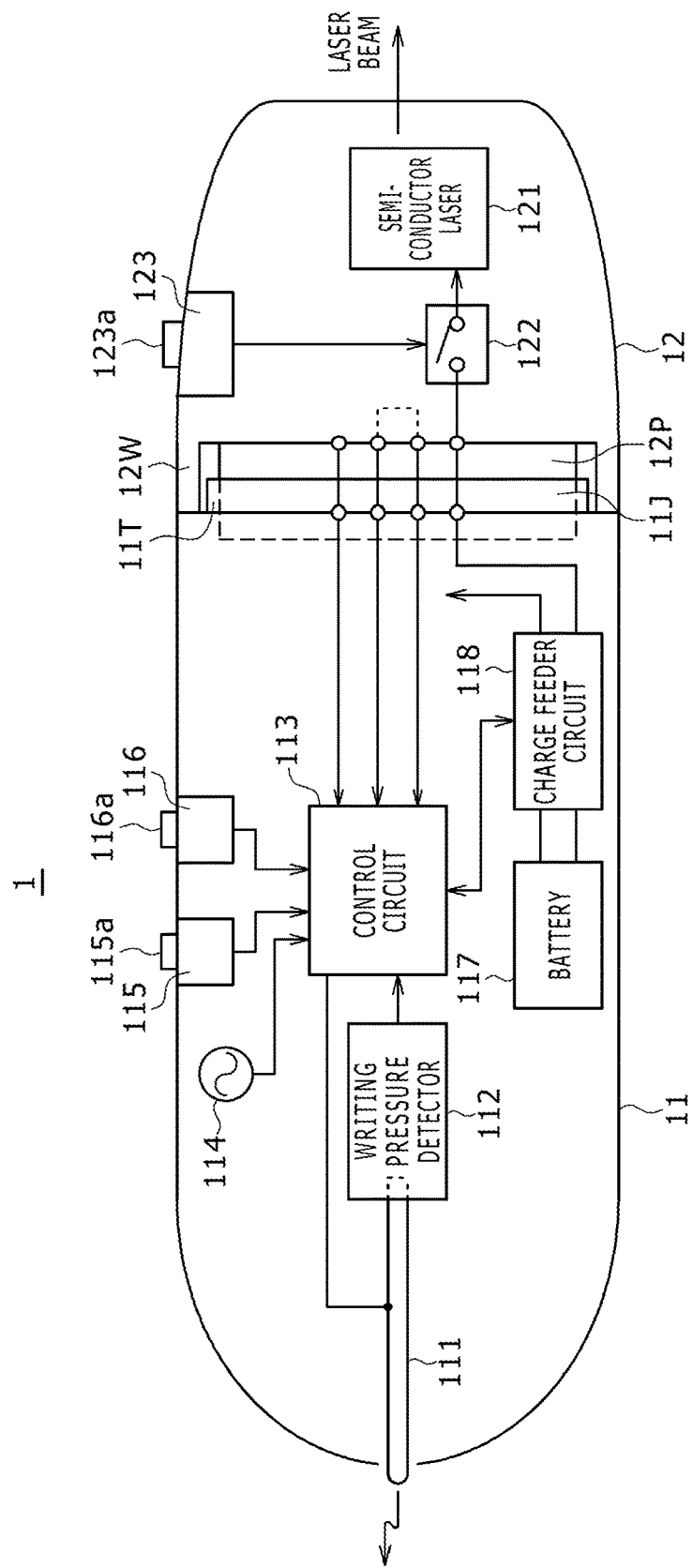
FIG. 3 is a block diagram showing an example of a typical structure of the electronic pen according to the first embodiment.

FIG. 3 is a block diagram showing an example of a typical structure of the electronic pen 1 as the first embodiment. As described above, the connector plug 12P of the expansion device 12 is inserted into the connector jack 11J at the rear end of the electronic pen body 11 to connect the expansion device 12 with the electronic pen body 11. The connection constitutes the electronic pen 1 having the electronic pen function and the laser pointer function. In this case, the cylindrical part 11T of the electronic pen body 11 is interlocked with the wall 12W of the expansion device 12. The interlock reinforces the connection of the electronic pen body 11 with the expansion device 12 while strongly protecting the connector jack 11J and the connector plug 12P being coupled to each other.

The expansion device 12 is first described below. As shown in FIG. 3, the expansion device 12 includes a semiconductor laser 121, a power switch 122, a switch circuit 123, and a switch 123a. The semiconductor laser 121 is an element that performs laser oscillation by having a current flowing through a semiconductor therein. Light emission is performed by the semiconductor laser 121 in the same manner as by a light emitting diode (LED). The power switch 122 serves to switch between supply and non-supply of power to the semiconductor laser 121 from the electronic pen body 11, to be discussed later.

The switch circuit 123 feeds an on-signal to the power switch 122 while the switch 123a is being pressed by the user. The switch circuit 123 does not supply the on-signal to the power switch 122 while the user is not pressing the switch 123a. In this setup, only when the switch 123a is being pressed by the user, is the power switch 122 turned on to let the electronic pen body 11 power the semiconductor laser 121 for laser beam emission.

It was explained above that the power switch 122 is electrically turned on and off. Alternatively, the power switch 122 may be turned on and off mechanically in response to the switch 123a being pressed and released, for example.

The electronic pen body 11 is next described below. As shown in FIG. 3, the electronic pen body 11 includes a stylus 111, a writing pressure detector 112, a control circuit 113 (e.g., microprocessor), an oscillator 114, side switches 115 and 116, a battery 117, and a charge feeder circuit 118. The switch operation parts 115a and 116a are operation buttons that correspond to the side switches 115 and 116 respectively. The side switches 115 and 116 and the switch operation parts 115a and 116a are designed to implement a so-called right click button function and left click button function of the mouse acting as a pointing device. The battery 117 is a secondary battery that includes a power storage element. Under control of the control circuit 113, the charge feeder circuit 118 charges the battery 117 with the supply of power from the outside and lets the battery 117 supply power to relevant parts.

The stylus 111 is a rod-like part formed of an electrically conducting material. One end of the stylus 111 protrudes from the enclosure (case) of the electronic pen body 11 to form a pen tip. The other end of the stylus 111 is attached to the writing pressure detector 112 mounted in the electronic pen body 11. In this structure, when writing pressure is applied to the pen tip of the stylus 111, the stylus 111 applies pressure to the writing pressure detector 112. The writing pressure detector 112 is structured to include a variable capacitance capacitor that has its capacitance varied by means of a mechanical moving part pressed by the stylus 111.

That is, the capacitance of the variable capacitance capacitor mounted in the writing pressure detector 112 is varied depending on the writing pressure (pressing force) applied to the stylus 111. In this structure, the capacitance of the variable capacitance capacitor is supplied to the control circuit 113. In accordance with the supplied capacitance, the control circuit 113 detects (senses) the writing pressure applied to the stylus 111.

The variable capacitance capacitor to be mounted in the writing pressure detector 112 may be provided in the form of a micro electro mechanical system (MEMS) chip made of semiconductor devices. As another alternative, the variable capacitance capacitor to be mounted in the writing pressure detector 112 as a pressure sensitive part may be replaced with another pressure sensitive part that varies its inductance or resistance value in keeping with pressing force.

The control circuit 113 performs control regarding a position designation signal sent from the electronic pen body 11 and the supply of power to the expansion device 12, among others. As shown in FIG. 3, the control circuit 113 is connected with the writing pressure detector 112, the oscillator 114, the side switches 115 and 116, the charge feeder circuit 118, and a data terminal of the connector jack 11J. A signal line from the control circuit 113 is connected to the stylus 111. The control circuit 113 also performs control to supply the stylus 111 with the position designation signal reflecting the signal from the oscillator 114 so that the position designation signal is transmitted to the position detection circuit via the stylus 111.

The control circuit 113 further detects writing pressure from the capacitance of the variable capacitance capacitor in the writing pressure detector 112 and varies, for example, the frequency (phase) of the position designation signal supplied to the stylus 111 in keeping with the detected writing pressure. This allows the position detection circuit to detect (sense) not only the designated position but also the writing pressure in accordance with the frequency (phase) of the position designation signal from the electronic pen 1 of the first embodiment.

Operating the switch operation part 115a or 116a of the side switch 115 or 116 causes the corresponding side switch 115 or 116 to supply the control circuit 113 with a signal (on-signal) indicating the operation. Given the on-signal from the side switch 115 or 116, the control circuit 113 typically varies the frequency (phase) of the position designation signal fed to the stylus 111 in response to the side switch 115 or 116 being operated. In accordance with the frequency (phase) of the position designation signal from the electronic pen 1 of the first embodiment, the position detection circuit determines that the switch operation part 115a or 116a of the side switch 115 or 116 is operated. In this manner, the control circuit 113 performs diverse kinds of control regarding the position designation signal.

Furthermore, when a matching connector plug is inserted into the connector jack 11J, the control circuit 113 recognizes the type of the device corresponding to the connector plug by use of a signal coming from the connected device. For example, if the control circuit 113 recognizes that the connected connector plug is derived from a commercial power supply, the control circuit 113 performs control to switch the charge feeder circuit 118 to charging mode. This allows an external power supply to charge the battery 117 via the charge feeder circuit 118.

If the signal from a connected device causes the control circuit 113 to recognize the device as the expansion device 12 implementing the laser pointer function, the control circuit 113 performs control to switch the charge feeder circuit 118 to power feed mode. This allows the power from the battery 117 to be fed to the expansion device 12. If the control circuit 113 detects writing pressure based on the capacitance from the writing pressure detector 112, the control circuit 113 controls the charge feeder circuit 118 not to feed power from the battery 117 to the expansion device 12 because the electronic pen body 11 is currently used. This prevents inadvertent laser emission during use of the electronic pen body 11.

The control circuit 113 is also capable of monitoring the voltage of the battery 117 via the charge feeder circuit 118. For example, for a specific time period, a voltage value of the battery 117 high enough to maintain the electronic pen function is defined as the threshold value. The threshold value is stored into a memory of the control circuit 113. When the voltage of the battery 117 being monitored drops below the threshold value held in the memory, the control circuit 113 controls the charge feeder circuit 118 not to feed power from the battery 117 to the expansion device 12. This minimizes the possibility that the power level of the battery 117 will drop too low to maintain the electronic pen function of the electronic pen body 11.

Furthermore, when no device is connected via the connector jack 11J, the control circuit 113 controls the charge feeder circuit 118 not to feed power to the outside through the connector jack 11J. In this manner, the control circuit 113 suitably controls the supply of power to the expansion device 12 connected via the connector jack 11J.

As described above, if the electronic pen function of the electronic pen body 11 is in use, or if a dropping voltage value of the battery 117 makes it increasingly likely that the electronic pen function of the electronic pen body 11 will not be maintained, then the electronic pen 1 does not feed power to the expansion device 12. In this manner, the electronic pen 1 keeps the electronic pen function usable as much as possible while permitting sufficient use of the laser pointer function that consumes a relatively large amount of power.

(Outline of Position Detection Circuit Based on Capacitive Coupling Method)

Figure 4:
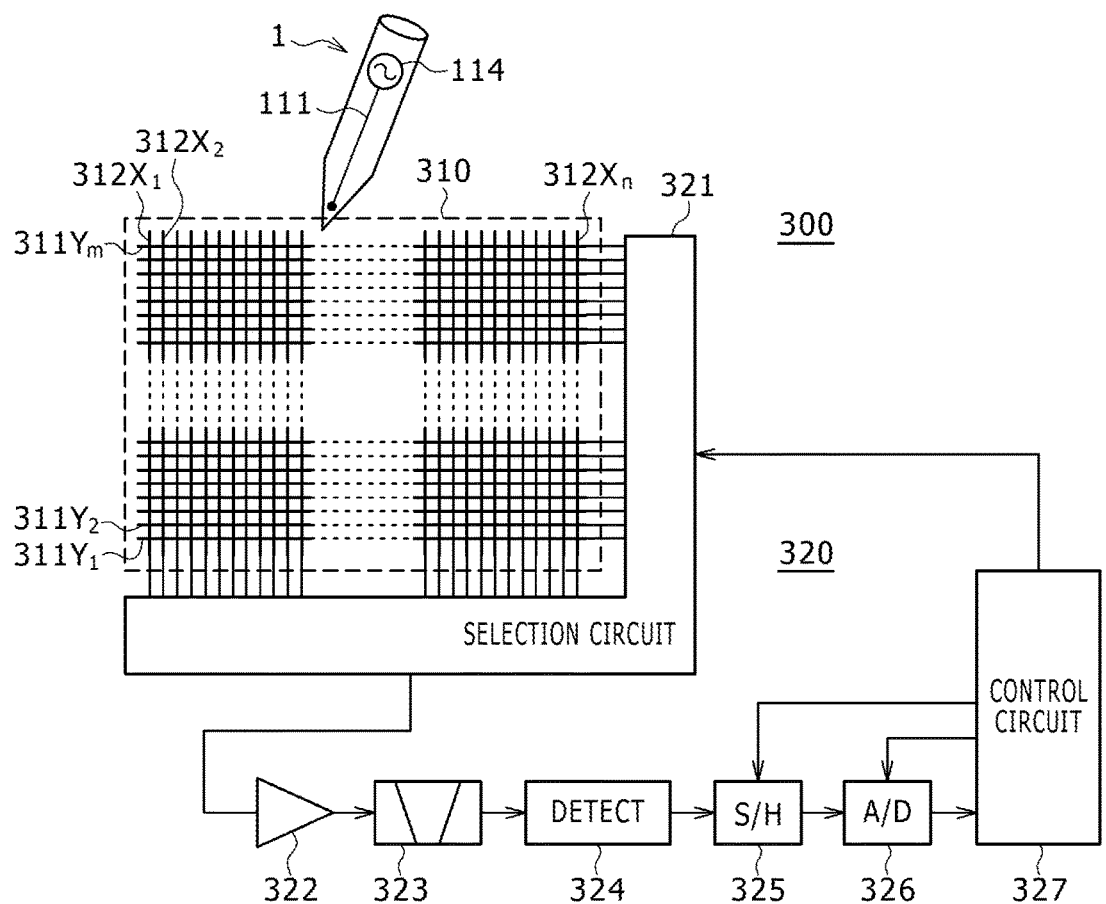
FIG. 4 is a block diagram showing an example of a typical structure of a capacitive position detection circuit.

Described below is a typical structure of the position detection circuit used in conjunction with the electronic pen 1 according to the first embodiment. FIG. 4 is a block diagram showing an example of a position detection circuit 300 that uses a capacitive coupling type of coordinate detection sensor receiving signals from the electronic pen body 11 of the electronic pen 1 in the first embodiment, the coordinate detection sensor thereby detecting the position of the electronic pen body 11 on the sensor as well as writing pressure and side switch status.

As shown in FIG. 4, the position detection circuit 300 of this example is made up of a capacitive coupling type coordinate detection sensor (simply called the sensor hereunder) 310 and a pen detection circuit 320 connected to the sensor 310. The sensor 310, of which no cross-sectional view is shown, is formed by a first conductor group 311, an insulation layer (not shown), and a second conductor group 312 stacked in that order from the bottom up. The first conductor group 311 has multiple first conductors 311Y1, 311Y2, . . . , 311Ym (m is a positive integer) extending in the crosswise direction (X-axis direction) and arrayed a specific distance apart from each other in the Y-axis direction, for example. The second conductor group 312 has second conductors extending in the longitudinal direction (Y-axis direction) perpendicular to the first conductor group 311 and arrayed a specific distance apart from each other in the X-axis direction.

As described, the sensor 310 of the position detection circuit 300 is structured to detect the position designated by the electronic pen using a sensor pattern formed by the first conductor group 311 and the second conductor group 312 intersecting each other. In the ensuing description, the first conductors 311Y1, 311Y2, . . . , 311Ym will be generically called the first conductor 311Y if there is no need to distinguish the individual first conductors. Likewise, the second conductors 312X1, 312X2, . . . , 312Xn will be generically called the second conductor 312X if there is no need to distinguish the individual second conductors.

The pen detection circuit 320 is made up of a selection circuit 321 acting as an input/output interface with the sensor 310, an amplification circuit 322, a band-pass filter 323, a detection circuit 324, a sample hold circuit 325, an analog-to-digital (AD) conversion circuit 326, and a control circuit 327 (e.g., microprocessor).

Based on a control signal from the control circuit 327, the selection circuit 321 selects one conductor 311Y or 312X from the first conductor group 311 and the second conductor group 312. The conductor selected by the selection circuit 321 is connected to the amplification circuit 322. The signal from the electronic pen body 11 is detected by the selected conductor and amplified by the amplification circuit 322. The output of the amplification circuit 322 is fed to the band-pass filter 323 that extracts only the frequency component of the signal sent from the electronic pen body 11.

The output signal of the band-pass filter 323 is detected by the detection circuit 324. The output signal of the detection circuit 324 is supplied to the sample hold circuit 325. The sample hold circuit 325 samples and holds the input at a specific timing using a sampling signal from the control circuit 327. The AD conversion circuit 326 converts the output of the sample hold circuit 325 into a digital value. The digital data from the AD conversion circuit 326 is read and processed by the control circuit 327.

The control circuit 327 operates according to a program stored in an internal read-only memory (ROM) to output control signals to the sample hold circuit 325, the AD conversion circuit 326, and the selection circuit 321. Given the digital data from the AD conversion circuit 326, the control circuit 327 calculates those coordinates of the position on the sensor 310 which are designated by the electronic pen body 11. Furthermore, the control circuit 327 detects the writing pressure via the writing pressure detector 112 of the electronic pen body 11 as well as the state of the side switches 115 and 116 of the electronic pen body 11.

On the PC 2 shown in FIG. 2, the touch panel 2TP is formed by the sensor 310 of the position detection circuit 300 and by a liquid crystal display (LCD), the two components being stacked (laminated) one on top of the other. That means the input area of the sensor 310 coincides with the display area of the LCD.

(Example of how Control Circuit 113 Controls Supply of Power to Expansion Device 12)

Figure 5:
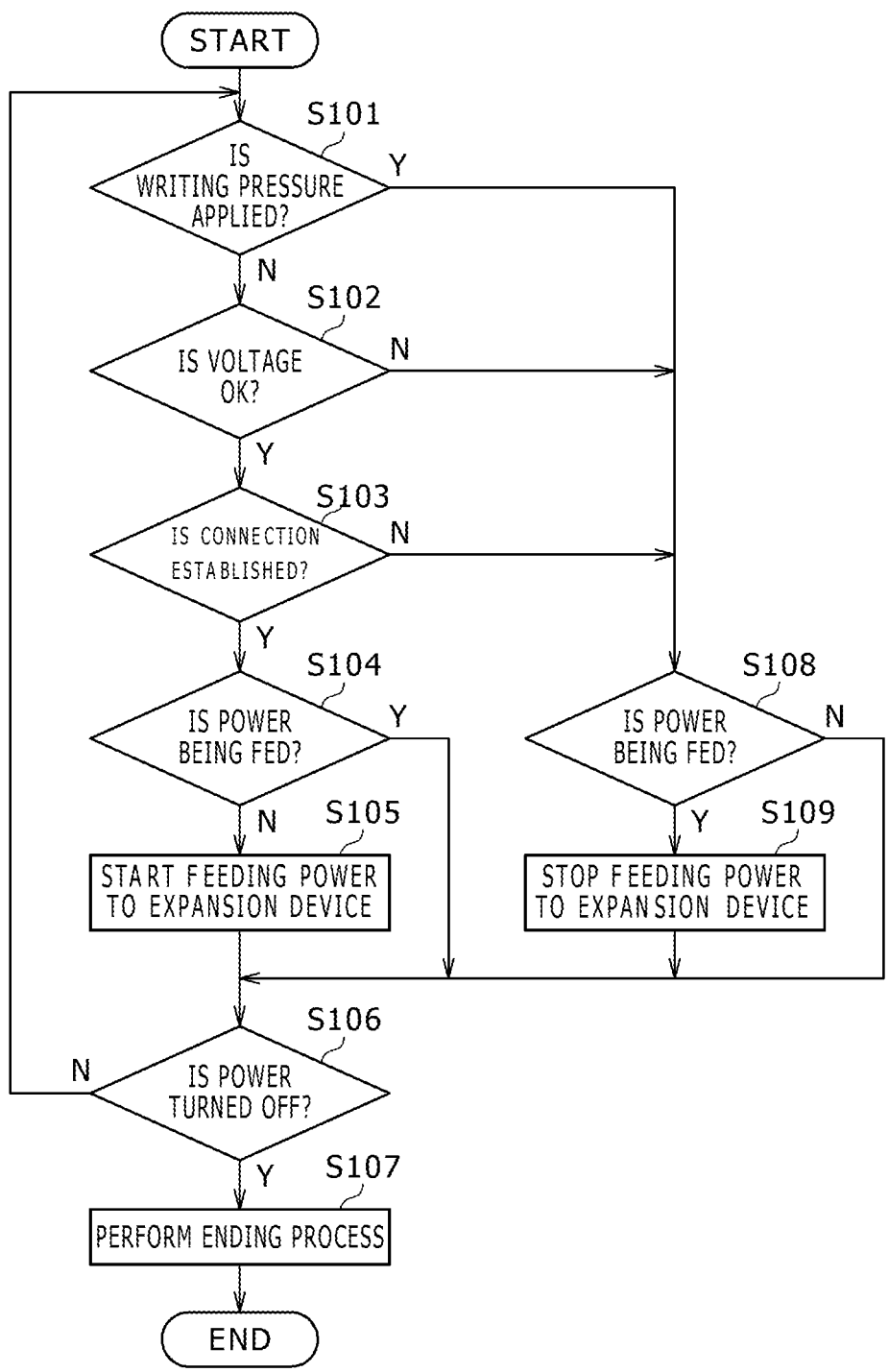
FIG. 5 is a flowchart showing an example of how supply of power to an expansion device is typically controlled.

FIG. 5 is a flowchart showing an example of how the control circuit 113 of the electronic pen body 11 functions to control the supply of power to the expansion device 12. The processes shown in the flowchart of FIG. 5 are performed when the electronic pen 1 is turned on. The processes are terminated when the electronic pen 1 is turned off. The supply of power may be turned on and off by specific operations such as pressing of the switch operation part 115a of the side switch 115 for a relatively long time. Obviously, a power-on/off switch may be provided on the electronic pen body 11 so that the on/off switch may be operated to turn on or off the supply of power.

When the electronic pen body 11 is turned on, the control circuit 113 of the electronic pen body 11 determines whether or not writing pressure is being detected via the writing pressure detector 112 (step S101). If it is determined in step S101 that writing pressure is not detected, that means the electronic pen body 11 is not in use. In this case, the control circuit 113 determines whether or not the voltage of the battery 117 monitored via the charge feeder circuit 118 exceeds a threshold value (step S102).

If it is determined in step S102 that the voltage of the battery 117 exceeds the threshold value (i.e., voltage is OK), that means the supply of power to the expansion device 12 is available. In this case, the control circuit 113 determines whether or not the expansion device 12 is connected via the connector jack 11J (step S103). If it is determined in step S103 that the expansion device 12 is connected, the control circuit 113 determines whether or not power is currently fed from the battery 117 to the expansion device 12 (step S104).

If it is determined in step S104 that power is not being fed from the battery 117 to the expansion device 12, then the control circuit 113 controls the charge feeder circuit 118 to start feeding power from the battery 117 to the expansion device 12 (step S105). A subsequent determination process in step S106 is reached in one of two cases: after the process of power feed is started in step S105, or when the battery 117 is determined to be currently feeding power to the expansion device 12 in step S104.

When step S106 is thus reached, the control circuit 113 determines whether or not the electronic pen body 11 is turned off. If it is determined in step S106 that the electronic pen body 11 has yet to be turned off, the foregoing processing is repeated from step S101. If it is determined in step S106 that the electronic pen body 11 is turned off, the control circuit 113 performs a specific ending process such as controlling the charge feeder circuit 118 to stop feeding power from the battery 117 to relevant parts (step S107). This terminates the processing shown in FIG. 5.

Meanwhile, another subsequent determination process in step S108 is reached in one of three cases: when it is determined in step S101 that writing pressure is detected; when it is determined in step S102 that the voltage of the battery 117 does not exceed the threshold value (below threshold value); or when it is determined in step S103 that the expansion device 12 is not connected.

When step S108 is thus reached, the control circuit 113 determines whether or not the battery 117 is currently feeding power to the expansion device 12. If it is determined in step S108 that the battery 117 is feeding power to the expansion device 12, then the control circuit 113 controls the charge feeder circuit 118 to stop feeding power from the battery 117 to the expansion device 12 (step S109).

Another subsequent determination process in step S106 is reached in one of two cases: after the process of power feed is stopped in step S109, or when it is determined in step S108 that the battery 117 is not feeding power to the expansion device 12. When step S106 is thus reached, a determination is made to see if the electronic pen body 11 is turned off as described above. If it is determined in step S106 that the electronic pen body 11 has yet to be turned off, the foregoing processing is repeated from step S101. If the electronic pen body 11 is determined to be turned off in step S106, the control circuit 113 performs the ending process (step S107). This terminates the processing shown in FIG. 5.

In the manner described above, the control circuit 113 of the electronic pen body 11 suitably controls the supply of power to the expansion device 12 connected via the connector jack 11J. This prevents inconveniences such as the inability to use the electronic pen function when needed because of an exhausted battery level following unnecessary or excessive use of the laser pointer function. That is, the electronic pen function of the electronic pen body 11 and the laser pointer function of the expansion device 12 may be used appropriately.

Moreover, the heavy battery 117 is mounted on the side of the electronic pen body 11. This lowers the center of gravity of the electronic pen body 11, so that the electronic pen function remains easy to use. Also, there is no need to manage power supplies individually in the electronic pen body 11 and in the expansion device 12.

Variations of First Embodiment

It was explained above that with the electronic pen 1 of the first embodiment, the expansion device 12 is furnished with the power switch 122. However, this is not limitative of the present disclosure. Alternatively, the power switch 122 may be omitted from the expansion device 12. Instead, the on-signal from the switch circuit 123 is sent to the control circuit 113 of the electronic pen body 11 via the connector plug 12P and connector jack 11J. The control circuit 113 may then control the charge feeder circuit 118 to feed power to the expansion device 12 only if no writing pressure is detected, if the voltage of the battery 117 exceeds the threshold value, and if the on-signal is supplied from the switch circuit 123 of the expansion device 12.

In the above variation, the battery 117 is prevented from feeding power to the expansion device 12 when writing pressure is being detected or when the voltage of the battery 117 is below the threshold value even if the on-signal is being supplied from the switch circuit 123 of the expansion device 12. This prevents wasteful consumption of power resulting from unnecessary laser emission.

In another variation, the electronic pen body 11 may be provided with a switch circuit that turns on and off the supply of power to the expansion device 12. The switch circuit may then be turned on and off depending on the presence or absence of the on-signal from the switch circuit 123 of the expansion device 12.

It was explained above that with the electronic pen 1 of the first embodiment, a voltage value of the battery 117 high enough to maintain the electronic pen function of the electronic pen body 11 is defined as the threshold value. It was also explained that if the voltage value of the battery 117 drops below the threshold value, the control circuit 113 functions to stop feeding power to the expansion device 12. However, this is not limitative of the present disclosure.

Suppose that a voltage E1 is needed to enable the electronic pen function of the electronic pen body 11 and that a voltage E2 is needed to activate the semiconductor laser 121 of the expansion device 12. Generally, the voltage E2 necessary for activating the semiconductor laser 121 is larger than the voltage E1 necessary for enabling the electronic pen function.

Given these characteristics, when a voltage Eb of the battery 117 is higher than the voltage E1 needed to enable the electronic pen function and is lower than the voltage E2 needed to activate the semiconductor laser 121 (E1<Eb<E2), the supply of power to the expansion device 12 may be arranged to be stopped. This arrangement stops the supply of power to the expansion device 12 when the battery 117 does not have a sufficient voltage to drive the semiconductor laser 121. This averts wasteful consumption of power to maintain the conditions for enabling the electronic pen function.

It was also explained above that the voltage value is considered the basis for controlling the supply of power to the expansion device 12. Alternatively, the charge feeder circuit 118 may measure the value of the current flowing through a specific resistor and perform control to determine whether or not to feed power to the expansion device 12 in accordance with the current value thus measured. As another alternative, the remaining level of the battery 117 may be obtained on the basis of the measured voltage value of the battery 117 or the value of the current that flows from the battery 117 through the specific resistor. In accordance with the remaining battery level thus obtained, control may be performed to feed or not to feed power to the expansion device 12.

The point is that control may be performed to determine whether to feed power to the expansion device 12 based on the power needed to enable the electronic pen function, on the power needed to enable the expanded function of the expansion device 12, and on the power available from the battery 117.

Second Embodiment

Outline of Second Embodiment

Described below is a second embodiment of the present disclosure made up of an electronic pen 1A and a position detection system formed by the electronic pen 1A and a PC. As with the electronic pen 1 of the first embodiment descried above using FIGS. 1A to 1E, the electronic pen 1A of the second embodiment is made of an electronic pen body 11A and an expansion device 12A. Like the electronic pen 1 of the first embodiment, the electronic pen body 11A is provided with a connector jack 11J and the expansion device 12A is furnished with a connector plug 12P. These connectors are used to establish connection between the electronic pen body 11A and the expansion device 12A.

That is, the connector between the electronic pen body 11A and the expansion device 12A in the case of the electronic pen 1A of the second embodiment is structured substantially similar configuration as the electronic pen 1 of the first embodiment shown in FIGS. 1A to 1E. When the electronic pen body 11A and the expansion device 12A are connected to each other, the connector plug 12P of the expansion device 12A, the connector jack 11J of the electronic pen body 11A, the cylindrical part 11T of the electronic pen body 11A, and the wall 12W of the expansion device 12A are interlocked with one another in that order from the inside outward to ensure the connection.

In their connected state, the connector jack 11J of the electronic pen body 11A and the connector plug 12P of the expansion device 12A are surrounded circumferentially by the cylindrical part 11T of the electronic pen body 11A and by the wall 12W of the expansion device 12A. As shown in FIG. 1A, the cylindrical part 11T of the electronic pen body 11A and the wall 12W of the expansion device 12A have a specific height each (i.e., lengths in the axial direction of the electronic pen 1A). This structure strongly protects both the connector jack 11J of the electronic pen body 11A and the connector plug 12P of the expansion device 12A in their connected state.

A gyro sensor mounted in the expansion device 12A of the electronic pen 1A of the second embodiment implements the so-called air mouse function. That is, the electronic pen 1A of the second embodiment is constituted by the electronic pen body 11A implementing the electronic pen function and by the expansion device 12A implementing the air mouse function.

(Mode of Use of Electronic Pen 1A)

Figure 6:
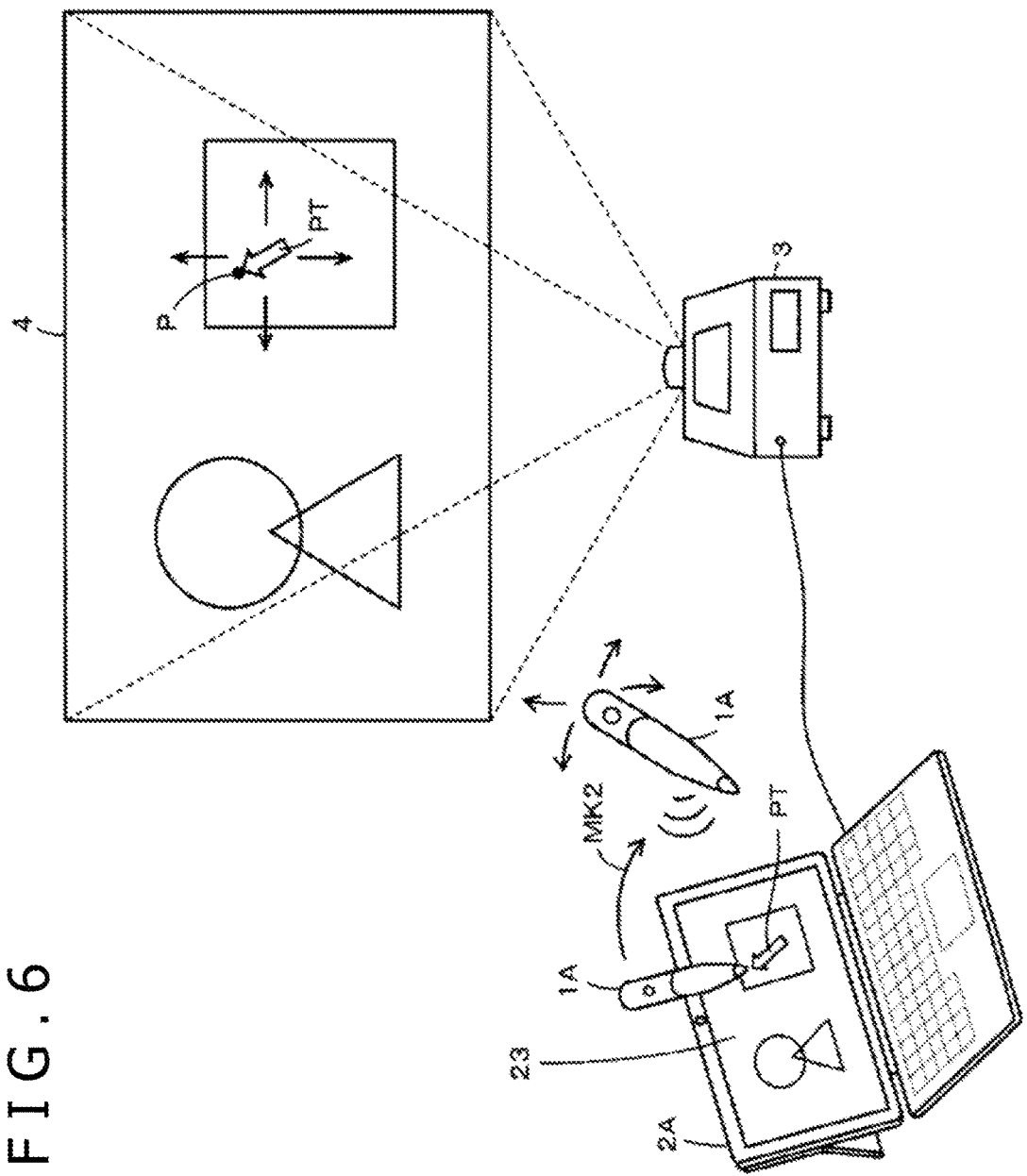
FIG. 6 is a view showing an example of how an electronic pen according to a second embodiment of the present disclosure is typically used.

FIG. 6 is a view showing an example of how the electronic pen 1A of the second embodiment is typically used. In FIG. 6, a PC 2A is mounted with a touch panel 23 based on a capacitive coupling method. The projector (image display device) 3 is supplied with image data from the PC 2A and projects an image reflecting the supplied image data onto the screen 4. As in the case of the above-described first embodiment, the stylus 111 of the electronic pen body 11A of the electronic pen 1A is brought into contact with and moved over the touch panel 23 of the PC 2 to input information such as drawings, pictures, characters, and symbols to the PC 2A. The information such as drawings, pictures, characters, and symbols input to the PC 2A is supplied to the projector 3 as the image data. An image reflecting the image data is then projected onto the screen 4 through the projector 3.

As described above, the second embodiment combines the electronic pen 1A, the PC 2A, and the projector 3 to make up the position detection system. With this position detection system, a pointer PT such as an arrow displayed on the image projected onto the screen 4 is moved to point to a desired position in the projected image. The air mouse function of the expansion device 12A is used to move the display position of the pointer PT. That is, as shown in FIG. 6, the electronic pen 1A is used to input information through the touch panel 23 of the PC 2A. When the stylus 111 of the electronic pen 1A is detached from the touch panel 23, the pointer PT is displayed pointing to that position P on the touch panel 23 with which the stylus 111 of the electronic pen 1A was most recently in contact.

In the case above, as indicated by an arrow MK2 in FIG. 6, the pointer PT is moved by first detaching the stylus 111 of the electronic pen 1A from the touch panel 23 and pointing the expansion device 12A, on the opposite side of the stylus 111, to the screen 4. Then with a switch operation part 126a held down, the expansion device 12A is reoriented to move the pointer PT in desired directions as indicated by arrows surrounding the electronic pen 1A. If it is desired to move the pointer PT upward from the current display position, the expansion device 12A of the electronic pen 1A is swung upward for reorientation. This, as will be discussed later in detail, causes the gyro sensor mounted in the expansion device 12A to output and transmit angular velocity data to the PC 2A via a wireless transmitter incorporated in the electronic pen body 11A.

With the second embodiment, the angular velocity data is made up of a rotation direction, a rotation angle, and a rotation time. That is, the angular velocity data indicates in which direction the expansion device 12A is rotated and at which angle and in how much time the rotation is made. The PC 2A receives the angular velocity data from the electronic pen body 11A, calculates the direction and the amount in which the pointer PT is moved in accordance with the received angular velocity data, and changes the display position of the pointer PT accordingly. In this manner, the display position of the pointer PT is moved in order to point to the desired position P on the screen 4.

It was explained above that the expansion device 12A of the electronic pen 1A is swung upward for reorientation to move the pointer PT upward from the current display position. Alternatively, the pointer PT may also be moved in a desired direction by swinging the expansion device 12A of the electronic pen 1A in that direction for reorientation. That is, the display position of the pointer PT can be moved in the direction desired by the user. The amount of the movement can also be varied in accordance with the angular velocity at which the expansion device 12A of the electronic pen 1A is swung for reorientation (i.e., as per the angle at which the expansion device is moved and the time in which the movement is made).

In the manner described above, the electronic pen 1A is used to transition seamlessly between inputting information to the PC 2A and moving the display position of the pointer PT on the screen 4. This facilitates explanations at conferences and meetings and thereby increases the benefits of the gatherings. As described above, the electronic pen 1A of the second embodiment provides both the electronic pen function and the so-called air mouse function by having the expansion device 12A connected to the electronic pen body 11A.

(Typical Structure of Electronic Pen 1A)

Figure 7:
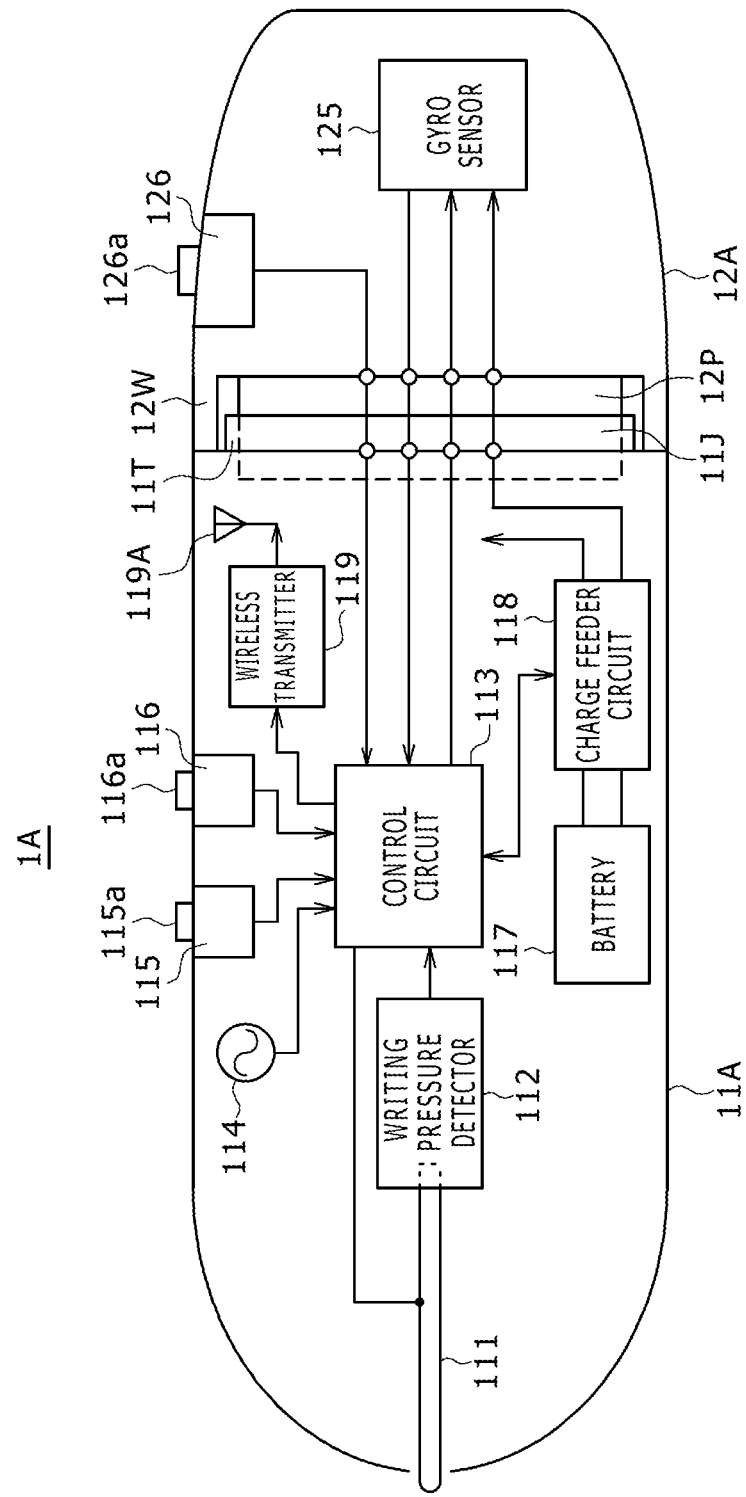
FIG. 7 is a block diagram showing an example of a typical structure of the electronic pen according to the second embodiment.

FIG. 7 is a block diagram showing an example of a typical structure of the electronic pen 1A of the second embodiment. As with the electronic pen 1 of the above-described first embodiment, the electronic pen 1A of the second embodiment is made up of two major components: the electronic pen body 11A, and the expansion device 12A. And as with the electronic pen body 11 of the electronic pen 1 of the first embodiment, the electronic pen body 11A implements primarily the electronic pen function. On the other hand, the expansion device 12A of the second embodiment is structured to implement the so-called air mouse function.

In the electronic pen 1A of the second embodiment shown in FIG. 7, the parts structured like the corresponding parts in the electronic pen 1 of the first embodiment explained above using FIG. 3 are assigned the same reference symbols and will not be described further in detail to avoid redundancy. The electronic pen 1A of the second embodiment shown in FIG. 7 is described below, emphasizing the parts different from those of the electronic pen 1 of the first embodiment discussed above using FIG. 3.

As shown in FIG. 7, the connector plug 12P of the expansion device 12A is inserted into the connector jack 11J at the rear end of the electronic pen body 11A to establish a connection constituting the electronic pen 1A of the second embodiment. The expansion device 12A is first described below. As shown in FIG. 7, the expansion device 12A includes a gyro sensor 125, a switch circuit 126, and a switch operation part 126a.

The gyro sensor 125 is a kind of inertial sensor that implements angular velocity measurement. As such, the gyro sensor 125 detects how much the angle of the expansion device 12A housing the sensor is changed per unit time. More specifically, the gyro sensor 125 is a three-axis gyro sensor (angular velocity sensor) that outputs angular velocity data indicating in which direction the expansion device 12A is moved rotatably and at how much angle and during what time the rotation is made.

The switch circuit 126 has a so-called two-stage press switch structure. In a half-pressed (lightly pressed) state, the switch circuit 126 outputs a gyro sensor-on/off signal. In a fully pressed (strongly pressed) state, the switch circuit 126 outputs a position determination signal. The gyro sensor-on/off signal and the position determination signal from the switch circuit 126 are fed to the control circuit 113 of the electronic pen body 11A via the connector plug 12P and the connector jack 11J.

That is, when the user half-presses the switch operation part 126a, the control circuit 113 of the electronic pen body 11A performs on/off control of the gyro sensor 125. When the gyro sensor 125 is turned on and put in an active state, the control circuit 113 receives angular velocity data from the gyro sensor 125 and sends it to the PC 2A. When the user fully presses the switch operation part 126a, the control circuit 113 of the electronic pen body 11A transmits the position determination signal to the PC 2A. This allows the position identified by the angular velocity data received most recently from the gyro sensor 125 to be identified as the position designated by the user.

The above-described operations are explained below from the point of view of the position detection system shown in FIG. 6. While the switch operation part 126a is being half-pressed, the pointer PT is moved over the screen 4 in accordance with the angular velocity data from the gyro sensor 125 reflecting the direction in which the expansion device 12A is moved. The pointer PT is thus positioned to a desired object on the screen 4. When the switch operation part 126a is fully pressed, the switch circuit 126 transmits the position determination signal to the PC 2A. The object pointed to by the pointer PT on the screen 4 is then selected and determined.

Instead of the two-stage press switch, there may be provided two switches: an on/off switch for the gyro sensor 125 and a switch for position determination for selective use. That is, the on/off switch for the gyro sensor 125 performs on/off control (activation and deactivation) of the gyro sensor 125. Only when the gyro sensor 125 is in the activate state, is the position determination switch enabled and operated to determine the position.

It is also possible to activate the gyro sensor 125 only while the user is continuously pressing the switch operation part 126a and to deactivate the gyro sensor 125 while the user is not pressing the switch operation part 126a. In this case, the position pointed to by the pointer PT is determined at the time the user releases the switch operation part 126a after holding it down continuously.

The electronic pen body 11A is described next. As shown in FIG. 7, the electronic pen body 11A of the second embodiment differs from the electronic pen body 11 of the first embodiment shown in FIG. 3 in that the electronic pen body 11A is provided with a wireless transmitter 119 and an antenna 119A. In the second embodiment, the wireless transmitter 119 and the antenna 119A implement the wireless communication function according to the Bluetooth (registered trademark) standard, one of the standards for near-field communication of digital devices.

Also, as shown in FIG. 7, the switch circuit 126 of the expansion 12A is connected to the control circuit 113 of the electronic pen body 11A. The connection allows the on-signal from the switch circuit 126 to be supplied to the control circuit 113. The control circuit 113 of the electronic pen body 11A is further connected to the gyro sensor 125 of the expansion device 12A so that data can be exchanged therebetween. The charge feeder circuit 118 of the electronic pen body 11A is also connected to the gyro sensor 125 of the expansion device 12A so that the battery 117 of the electronic pen body 11A may feed power to the gyro sensor 125 of the expansion device 12A.

When the switch operation part 126a of the switch circuit 126 is half-pressed, the control circuit 113 of the electronic pen body 11A performs on/off control of the gyro sensor 125. That is, with the switch operation part 126a of the switch circuit 126 half-pressed, the control circuit 113 turns on the currently inactive gyro sensor 125 and puts it in the active state, or turns off the currently active gyro sensor 125 and puts it in the inactive state.

When the gyro sensor 125 is in the active state, the control circuit 113 of the electronic pen body 11A receives angular velocity data from the gyro sensor 125. The control circuit 113 transmits the received angular velocity data wirelessly to the PC 2A via the wireless transmitter 119 and the antenna 119A. In this manner, the angular velocity data reflecting the swinging movement of the expansion device 12A is transmitted to the PC 2A. In turn, the PC 2A changes the display position of the pointer PT on the screen 4 as described above using FIG. 6.

With the gyro sensor 125 in the active state, fully pressing the switch operation part 126a of the switch circuit 126 causes the control circuit 113 of the electronic pen body 11A to transmit a determination signal to the PC 2A. The determination signal causes the PC 2A to determine that the position identified by the angular velocity data received from the gyro sensor 125 is the position designated by the user.

As with the electronic pen 1 of the first embodiment, the electronic pen 1A of the second embodiment thus controls the supply of power from the battery 117 of the electronic pen body 11A to the expansion device 12A.

(Devices that, Together with Electronic Pen 1A, Make Up Position Detection System)

FIG. 8 is a block diagram showing an example of a typical structure of the PC 2A and the projector 3 which, together with the electronic pen 1A, make up the position detection system. The PC 2A receives two kinds of input: the input of position designation using the electronic pen function of the electronic pen body 11A of the electronic pen 1A, and the input of position designation using the air mouse function of the expansion device 12A of the electronic pen 1A. As shown in FIG. 8, the PC 2A includes a control circuit 21, a display controller 22, a touch panel 23, a wireless transmitter 24, and an antenna 24A.

The control circuit 21 controls the components of the PC 2A. Under control of the control circuit 21, the display controller 22 displays images on a display 400, and outputs to the projector 3 the image data for causing the projector 3 to display the same image displayed on the display 400. The touch panel 23 constitutes an input device for the PC 2A and is made up of the position detection circuit 300 and the display 400 stacked (laminated) one on top of the other.

The user may press (touch) display on the screen of the display 400 to input information. The user may also bring the stylus 111 of the electronic pen 1A into contact with, and move it over, the screen of the display 400 to input information such as characters, drawings, symbols, and pictures (as loci). The position detection circuit 300 may be structured as described above with reference to FIG. 4 and equipped with the sensor 310. In the second embodiment, the display 400 is an LCD.

In the second embodiment, the sensor 310 of the position detection circuit 300 and the display 400 are also stacked one on top of the other to make up the touch panel 23. That means the input area of the sensor 310 coincides with the display screen of the display 400.

In the second embodiment, the wireless transmitter 24 and the antenna 24A implement the wireless communication function according to the Bluetooth (registered trademark) standard, one of the standards for near-field communication of digital devices. The PC 2A equipped with the wireless transmitter 24 and the antenna 24A can conduct wireless communication with the electronic pen body 11A of the electronic pen 1A furnished with the wireless transmitter 119 and the antenna 119A.

The projector 3 is provided with a display controller 31 and a light emitter 32 (e.g., a light bulb). The display controller 31 generates an image signal for causing a display mounted in the light emitter 32 to display an image reflecting the image data from the PC 2A, and feeds the generated image signal to the light emitter 32. The light emitter 32 causes its display to display the image reflecting the image signal fed from the display controller 31. At the same time, the light emitter 32 emits light from behind the display so as to provide enlarged display on the screen 4 of the image displayed on the display.

In this manner, the same image input to the PC 2A through the touch panel 23 and displayed on the display 400 of the PC 2 is displayed enlarged on the screen 4 via the projector 3. Suppose that information is input using the stylus 111 of the electronic pen body 11A of the electronic pen 1A brought into contact with the display screen of the display 400, before the stylus 111 is detached from the display screen of the display 400. In this case, the control circuit 21 controls the display controller 22 to have the display 400 display the pointer PT pointing to the position P most recently touched by the stylus 111.

As a result, the same image displayed on the display screen of the display 400 is projected onto the screen 4 together with the pointer PT. The display position of the pointer PT is moved as follows: The expansion device 12A of the electronic pen 1A is first directed at the screen 4. With the switch operation part 126a half-pressed to activate the gyro sensor 125, the expansion device 12A is swung in the direction in which the pointer PT is desired to be moved. That is, the angular velocity data from the gyro sensor 125 of the expansion device 12A being swung is transmitted to the PC 2A via the wireless transmitter 119 and antenna 119A of the electronic pen body 11A.

The PC 2A receives the angular velocity data from the electronic pen body 11A via the wireless transmitter 24 and the antenna 24A. In accordance with the received angular velocity data, the control circuit 21 identifies the direction in which the pointer PT is to be moved and the amount of the movement. On the basis of the identified direction and amount of the pointer movement, the control circuit 21 causes the display controller 22 to change the display position of the pointer PT. When the gyro sensor 125 is in the active state, fully pressing the switch operation part 126a determines the position of the pointer PT that has been moved in keeping with the output of the gyro sensor 125. This is how the object is selected.

As described above, the position detection system of the second embodiment permits input of information via the touch panel 23 using the electronic pen 1A. Furthermore, the position detection system of the second embodiment changes and determines the display position of the pointer PT using the air mouse function implemented primarily by the expansion device 12A of the electronic pen 1A.

(Coordinated Operations of Electronic Pen 1A and PC 2A)

Figure 9A:
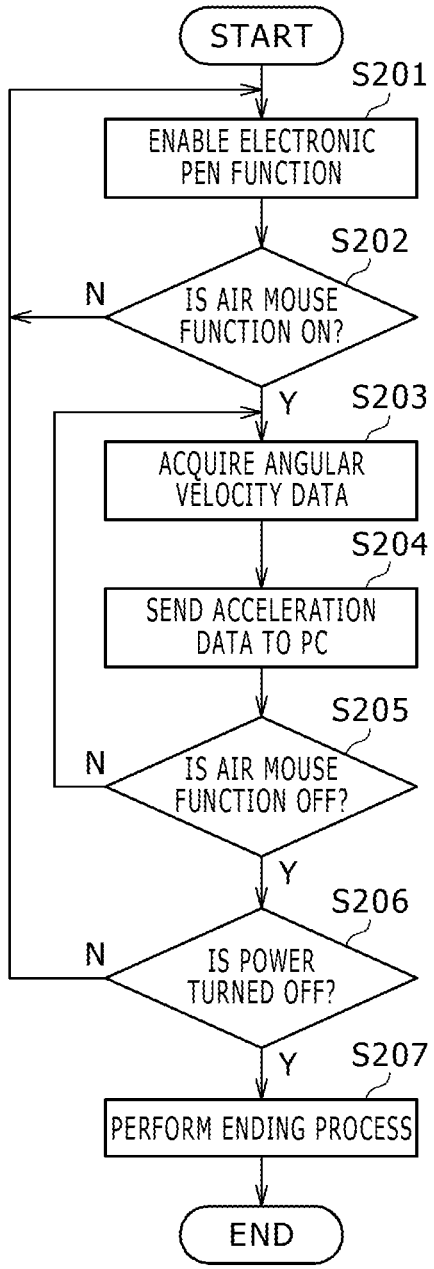
FIGS. 9A and 9B are flowcharts showing an example of how the electronic pen and the PC making up the position detection system according to the second embodiment coordinate processing with each other.
Figure 9B:
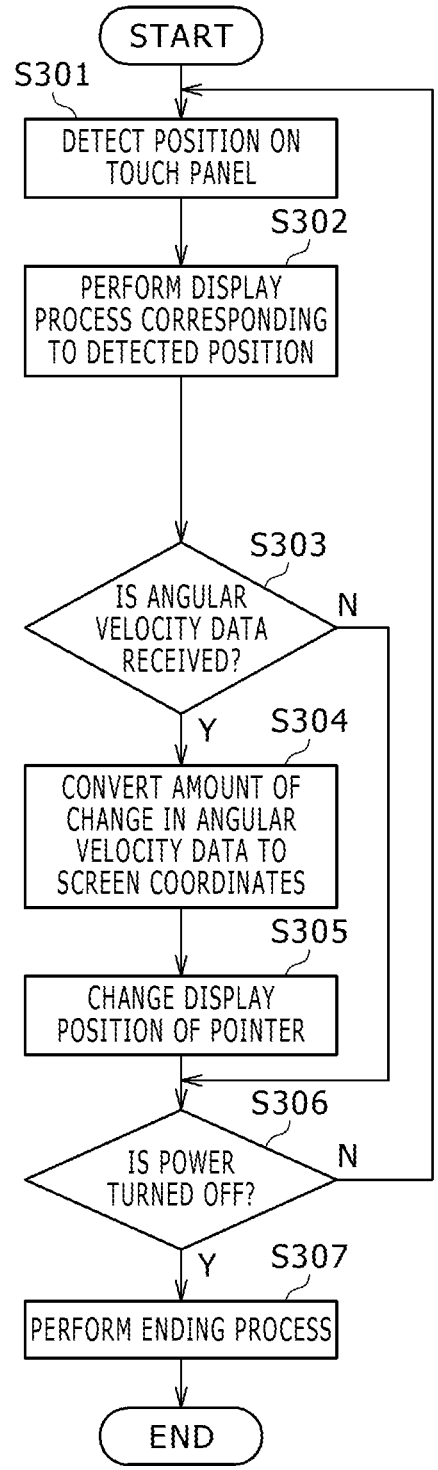

FIGS. 9A and 9B are flowcharts showing an example of how the electronic pen 1A and the PC 2A making up the position detection system of the second embodiment coordinate processing with each other. FIGS. 9A and 9B outline the processes performed by the electronic pen 1A and by the PC 2A respectively. The processing of the electronic pen 1A shown in FIG. 9A is first explained below, followed by the processing of the PC 2A in FIG. 9B.

The electronic pen 1A is turned on by pressing the switch operation part 115a, for example, for a relatively long time. The control circuit 113 then controls the charge feeder circuit 118 to feed power to the components and starts the processing shown in FIG. 9A. In the electronic pen 1A, the control circuit 113 controls the relevant components to enable the electronic pen function of the electronic pen body 11A (step S201). This causes the electronic pen body 11A to start sending the position detection signal.

The control circuit 113 of the electronic pen 1A determines whether or not the air mouse function is turned on (step S202). The control circuit 113 manages the state of the gyro sensor 125. Thus if the gyro sensor 125 is in the inactive state and if the on/off signal is supplied from the switch circuit 126 with the switch operation part 126a of the expansion device 12A being half-pressed, it is determined in step S202 that the air mouse function is turned on.

If it is determined in step S202 that the air mouse function is not turned on, the foregoing processing is repeated from step S201 so that position designation input will be made continuously through the electronic pen body 11A of the electronic pen 1A. If it is determined in step S202 that the air mouse function is turned on, the control circuit 113 of the electronic pen body 11A acquires angular velocity data from the gyro sensor 125 of the expansion device 12A (step S203). The control circuit 113 transmits the angular velocity data acquired in step S203 to the PC 2A via the wireless transmitter 119 and the antenna 119A (step S204). If the switch operation part 126a of the expansion device 12A is fully pressed in the process of step S204, the position determination signal is transmitted to the PC 2A.

Thereafter, the control circuit 113 of the electronic pen body 11A determines whether or not the air mouse function is turned off (step S205). If the gyro sensor 125 is in the active state and if the on/off signal is supplied from the switch circuit 126 with the switch operation part 126a of the expansion device 12A being half-pressed, it is determined in step S205 that the air mouse function is turned off. If it is determined in step S205 that the air mouse function is not turned off, the foregoing processing is repeated from the step S203. The process of acquiring angular velocity data is thus repeated and so is the process of transmitting the acquired angular velocity data to the PC 2A.

Suppose that in step S205 it is determined that the air mouse function is turned off. In this case, the control circuit 113 of the electronic pen body 11A determines whether or not the electronic pen 1A is turned off by pressing the switch operation part 115a, for example, for a relatively long time (step S206).

If it is determined in step S206 that the electronic pen 1A is not turned off, the control circuit 113 repeats the processing from step S201. If it is determined in step S206 that the electronic pen 1A is turned off, the control circuit 113 performs a specific ending process such as controlling the charge feeder circuit 118 to stop feeding power to the relevant parts (step S207). This terminates the processing shown in FIG. 9A.

Meanwhile, pressing the power button, not shown, of the PC 2A turns it on and starts the processing shown in FIG. 9B. When turned on, the PC 2A starts detecting the position designated by the electronic pen 1A, the writing pressure of the electronic pen 1A, and the state of the side switch being pressed or the like through the touch panel 23 (step S301). In the PC 2A, the control circuit 21 and the display controller 22 perform processing to display pen loci and other figures resulting from the position being designated and detected (step S302). If the designated position of the electronic pen 1A is not detected in step S302, it may well mean that the stylus 111 of the electronic pen 1A is detached from the touch panel 23. In that case, a process is performed to display the pointer PT pointing to the most recently designated position P.

The control circuit 21 of the PC 2A determines whether or not angular velocity data or a position determination signal is received from the electronic pen 1A via the antenna 24A and the wireless transmitter 24 (step S303). If it is determined in step S303 that the angular velocity data is received, the control circuit 21 converts the amount of change in the received angular velocity data to the screen coordinates of the position to which the pointer PT is to be moved (step S304). Thereafter, the control circuit 21 controls the display controller 22 to change the display position of the pointer PT to the position designated by the screen coordinates obtained in step S304 (step S305).

If it is determined in step S303 that the position determination signal is received, the control circuit 21 determines that the position designated by the most recently received angular velocity data is the finalized position, and selects the object located at that position. Thereafter, the control circuit 21 goes to step S305 and fixes the pointer PT to the finalized position.

When the process of step S305 is completed, or when it is determined in step S303 that the angular velocity data is not received, the control circuit 21 determines whether or not an operation is performed to turn off the PC 2A (step S306). If it is determined in step S306 that no operation is performed to turn off the PC 2A, the control circuit 21 repeats the processing from step S301. If it is determined in step S306 that an operation is performed to turn off the PC 2A, the control circuit 21 performs a specific ending process such as stopping the supply of power to the relevant parts (step S307). This terminates the processing shown in FIG. 9B.

As described above, the electronic pen 1A of the second embodiment has the electronic pen function and the air mouse function. Acting in coordination with the PC 2A equipped with the touch panel 23 and the wireless transmitter 24, the electronic pen 1A transitions seamlessly between inputting information to the PC 2A using the electronic pen function and moving the display position of the pointer PT using the air mouse function. This facilitates explanations at conferences and meetings and thereby increases the benefits of the gatherings.

In the case of the electronic pen 1A of the second embodiment, the heavy battery 117 is also mounted on the side of the electronic pen body 11A. This lowers the center of gravity of the electronic pen body 11A, so that the electronic pen function is easy to use. Also, as with the electronic pen 1 of the first embodiment, the control circuit 113 of the electronic pen body 11A performs control to feed power from the battery 117 mounted in the electronic pen body 11A to the expansion device 12A.

Also in the case of the electronic pen 1A of the second embodiment, the connector jack 11J of the electronic pen body 11A and the connector plug 12P of the expansion device 12A in their connected state are surrounded circumferentially by the cylindrical part 11T of the electronic pen body 11A and by the wall 12W of the expansion device 12A. The cylindrical part 11T of the electronic pen body 11A and the wall 12W of the expansion device 12A strongly protect both the connector jack 11J of the electronic pen body 11A and the connector plug 12P of the expansion device 12A in their connected state.

(Control of Supply of Power to Expansion Device 12A of Electronic Pen 1A)

With the electronic pen 1A of the second embodiment, as with the electronic pen 1 of the first embodiment, control may be performed to supply power from the battery 117 to the expansion device 12A.

That is, as described above with reference to the flowchart of FIG. 5, suppose that the control circuit 113 of the electronic pen body 11A does not detect writing pressure and does not currently feed power to the expansion device 12A while the voltage of the battery 117 is being higher than the threshold value. In this case, the control circuit 113 controls the charge feeder circuit 118 to start feeding power from the battery 117 to the expansion device 12A. Suppose also that after the supply of power to the expansion device 12A is started, the control circuit 113 detects writing pressure, finds the voltage of the battery 117 to be equal to or lower than the threshold value, or loses connection with the expansion device 12A. In this case, the control circuit 113 controls the charge feeder circuit 118 to stop feeding power to the expansion device 12A.

Suppose further that the control circuit 113 of the electronic pen body 11A does not detect writing pressure, finds the voltage of the battery 117 to be higher than the threshold value, and does not currently feed power to the expansion device 12A. In this case, too, the control circuit 113 controls the charge feeder circuit 118 to feed power from the battery 117 to the expansion device 12A provided that the on-signal is coming from the switch circuit 126 of the expansion device 12A. If the on-signal stops coming from the switch circuit 126 of the expansion device 12A, the control circuit 113 controls the charge feeder circuit 118 to stop feeding power from the battery 117 to the expansion device 12A. In this manner, the supply of power to the expansion device 12A may be controlled by taking into consideration the on-signal coming or not coming from the switch circuit 126 of the expansion device 12A.

Variations of Second Embodiment

It was explained above that with the second embodiment, the pointer position is displayed when the expansion device 12A is used to change the position of the pointer PT while information is being input to the sensor 310 of the position detection circuit 300 using the electronic pen body 11A. That is, when the position designated by the electronic pen 1A disappears, the position that has just disappeared (i.e., the most recently designated position) is considered the reference point. The reference point is then used as the position P pointed to by the pointer PT. However, this is not limitative of the present disclosure.

Alternatively, at the end of the designation of position by the electronic pen body 11A, the reference point first pointed to by the pointer PT may be any position, such as the center of the display screen of the display 400, one of the four corners of the display screen, or any predetermined position on the display screen.

It was explained above that the position detection system of the second embodiment is made up of the electronic pen 1A, the PC 2A acting as an information processing device, and the projector 3 as a display processing device. However, this is not limitative of the present disclosure. Alternatively, only the electronic pen 1A and the PC 2A as the information processing device can make up the position detection system. With this system, the expansion device 12A is operated to move the display position of the pointer PT on the display screen of the display 400 on the PC 2A.

It was explained above that in the position detection system of the second embodiment, the PC 2A acting as the information processing device is furnished with the display 400. Alternatively, the position detection system may be configured in such a manner that with the PC 2A devoid of the display 400, only the images displayed by the projector 3 may be used.

In another variation, the position detection system may be constituted by a so-called digitizer made of a board incorporating a touch sensor for position detection (coordinate detection sensor) and of an electronic pen for position designation, and by an ordinary PC equipped with only a display device and devoid of a touch panel. In this case, information is input to the PC through the digitizer using the electronic pen body 11A of the electronic pen 1, so that the input information is displayed on the display device of the PC. The pointer PT is displayed on the display device. The expansion device 12A of the electronic pen 1A then functions to let the display position of the pointer PT be moved on the display device of the PC.

As described above, the position detection system according to the present disclosure may be constituted by the electronic pen 1A, by the input device furnished with the position detection circuit, and by the information processing device which generates image information reflecting the input information received via the input device and which supplies the generated information to the display or the image display device while wirelessly communicating with the electronic pen 1A.

In the above-described embodiments, the input area of the sensor 310 coincides with the display area of the display screen on the display of the PC 2 or 2A. The display area for image display on the screen 4 corresponds to the display area of the display screen on the display of the PC 2 or 2A. This makes it possible to designate the position via the sensor 310 and display information at that position on the display screen of the display which corresponds to the designated position. The image displayed on the display screen of the display is then displayed enlarged on the screen 4.

Still, the relations between the input area of the sensor 310, the display area of the display screen on the display of the PC 2 or 2A, and the display area for image display on the screen 4 are not necessarily limited to those of the above-described embodiments. At least, the input area of the sensor 310 need only be included in the display area of the display screen on the display of the PC 2 or 2A, and the display area of the display screen on the display of the PC 2 or 2A need only be included in the display area for image display on the screen 4. These relations ensure one-on-one correspondence between the designated position and the display position.

It was explained above that in the second embodiment, the electronic pen 1A and the PC 2A have the wireless communication function according to the Bluetooth (registered trademark) standard. Alternatively, a communication protocol according to any one of diverse communication standards may be used to establish suitable communication between the electronic pen 1A and the PC 2A.

It was also explained above that in the second embodiment, the pointer PT displayed on the display 400 of the PC 2A or on the screen 4 has an arrow shape. Alternatively, the pointer PT may have any one of diverse shapes.

(Other Variations)

It was explained above that the first and the second embodiments use the electronic pens 1 and 1A of the signal oscillation type for example. Alternatively, the present disclosure may be implemented using an electronic pen of the resonance type. The resonance type of electronic pen has no need for a battery or any other power supply. However, in order to keep the center of gravity of the electronic pen body low, a battery may be mounted in the electronic pen body to feed power to the expansion device. Even in this case, the supply of power to the expansion device may be controlled to be stopped at least while writing pressure is being detected. This prevents useless activation of the expansion device and forestalls wasteful dissipation of the battery.

In the above-described embodiments, the expansion device 12 or 12A is connected to the electronic pen body 11 or 11A, that the expansion device 12 is a laser pointer in the first embodiment, and that the expansion device 12A is an air mouse (gyro sensor) in the second embodiment. That is, the electronic pen body 11 or 11A and the expansion device 12 or 12A are designed to implement the position designating function. However, this is not limitative of the present disclosure.

The expansion device connected to the electronic pen body 11 or 11A may incorporate diverse functions, such as a deleting function for deleting loci and other figures drawn by the electronic pen body 11 or 11A (i.e., a delete signal transmitting function), a switch function for switching on and off the power supply of the electronic pen body 11 or 11A, a camera function, and an audio recording function implemented by means of a microphone and an audio storage unit. The camera function may include a function to capture objects in the surroundings and a so-called color picker function that distinguishes and acquires colors of designated positions in captured images. In another variation, the wireless transmitter may be removed from the electronic pen body 11 or 11A and mounted instead in the expansion device. In a further variation, the electronic pen body 11 or 11A and the expansion device 12 or 12A may each be furnished with a wireless transmitter of different specifications.

In the above-described embodiments, the electronic pen body 11 or 11A is provided with the connector jack 11J (a recessed connector part) and the cylindrical part 11T, and the expansion device 12 or 12A is furnished with the connector plug 12P (a protruding connector part) and the wall 12W. Alternatively, these structures may be reversed. That is, the electronic pen body 11 or 11A may be provided with the connector plug and the wall, and the expansion device 12 or 12A may be furnished with the connector jack and the cylindrical body. The alternative structures also provide like benefits as those of the electronic pen 1 or 1A of the above-described embodiments.

In the above-described embodiments, the power supply is housed in the electronic pen body 11 or 11A. Alternatively, the power supply may be included in the expansion device 12 or 12A. In another alternative, the expansion device 12 or 12A itself may be arranged to constitute a power supply unit.

In the above-described embodiments, the operation part serving as a switch is provided to activate the expansion device 12 or 12A. Alternatively, a designation signal may be received from the side of a position detection device to enable the function of the expansion device 12 or 12A.

The expansion device 12 or 12A may incorporate multiple functions. In this case, the functions may be switched from one to another either manually by operation of a suitable operation switch, or automatically upon receipt of a designation signal from the position detection device.

It is to be noted that the embodiment of the present disclosure is not limited to the foregoing embodiments, and that various changes can be made without departing from the spirit of the present disclosure.

What is claimed is:

1. An electronic pen comprising:
    an electronic pen body including:
        a first position designator configured to transmit a signal to a position detection sensor;
        a controller;
        a first connector; and
        an internal power supply configured to be charged from an external power supply via the first connector; and
    an expansion device including:
        a second position designator configured to designate a position in an area different from an input area of the position detection sensor;
        a switch configured to receive an operation performed by a user; and
        a second connector,
    wherein the electronic pen body and the expansion device are attachable to and detachable from each other via the first connector and the second connector,
    wherein, when the electronic pen body and the expansion device are connected to each other, the internal power supply of the electronic pen body is enabled to feed power to the expansion device,
    wherein the controller of the electronic pen body controls a supply of power from the internal power supply of the electronic pen body to the expansion device,
    wherein, when the switch is operated, the controller performs control to transmit an instruction from the second position designator,
    wherein the first connector has a recessed structure,
    wherein the electronic pen body includes a cylindrical part having the first connector part formed therein,
    wherein the second connector has a protruding structure,
    wherein the expansion device includes a wall that surrounds the second connector, and
    wherein, when the first connector and the second connector are connected to each other, the cylindrical part and the wall are interlocked with each other and the first connector and the second connector are covered protectively.

2. The electronic pen according to claim 1,
    wherein the second position designator is a semiconductor laser that emits a laser beam and enables position designation using the emitted laser beam from the semiconductor laser.

3. The electronic pen according to claim 1,
    wherein, when connected to each other, the electronic pen body and the expansion device are configured to exchange data therebetween,
    wherein the electronic pen body has a wireless transmitter, and
    wherein, when the switch of the expansion device is operated, the controller performs control to receive an instruction from the second position designator and transmit the instruction via the wireless transmitter.

4. The electronic pen according to claim 3,
    wherein the second position designator is a gyro sensor, and the instruction from the second position designator is angular velocity data.

5. The electronic pen according to claim 1,
    wherein the first connector and the second connector each comply with a universal serial bus standard.

6. An electronic pen comprising:
    an electronic pen body including:
        a first position designator configured to transmit a signal to a position detection sensor;
        a controller;
        a first connector; and
        an internal power supply configured to be charged from an external power supply via the first connector; and
    an expansion device including:
        a second position designator configured to designate a position in an area different from an input area of the position detection sensor;
        a switch configured to receive an operation performed by a user; and
        a second connector,
    wherein the electronic pen body and the expansion device are attachable to and detachable from each other via the first connector and the second connector,
    wherein, when the electronic pen body and the expansion device are connected to each other, the internal power supply of the electronic pen body is enabled to feed power to the expansion device,
    wherein the controller of the electronic pen body controls a supply of power from the internal power supply of the electronic pen body to the expansion device,
    wherein, when the switch is operated, the controller performs control to transmit an instruction from the second position designator,
    wherein the first connector has a protruding structure,
    wherein the electronic pen body includes a wall that surrounds the first connector part, and
    wherein the second connector has a recessed structure; and
    wherein the expansion device includes a cylindrical part having the second connector formed therein,
    wherein, when the first connector and the second connector are connected to each other, the cylindrical part and the wall are interlocked with each other and the first connector and the second connector are covered protectively.

7. A position detection system comprising:
an electronic pen including an electronic pen body and an expansion device;
an information processing device having a display and a position detection circuit configured to detect a position designated by the electronic pen;
wherein the electronic pen body includes:
a first position designator configured to transmit a signal to a position detection sensor;
a controller;
a first connector;
an internal power supply configured to be charged from an external power supply via the first connector; and
a wireless transmitter; and
wherein the expansion device includes:
a second position designator configured to designate a position in an area different from an input area of the position detection sensor;
a switch configured to receive an operation performed by a user; and
a second connector,
wherein the electronic pen body and the expansion device are attachable to and detachable from each other via the first connector and the second connector,
wherein, when the electronic pen body and the expansion device are connected to each other, the internal power supply of the electronic pen body is enabled to feed power to the expansion device, the electronic pen body and the expansion device further enabling data to be exchanged therebetween,
wherein, when the switch of the expansion device is operated, the controller performs control to receive an instruction from the second position designator and transmit the instruction via the wireless transmitter of the electronic pen body, and
wherein the information processing device includes:
a display controller configured to perform control in such a manner that information is displayed at a position on a display screen of the display, the position corresponding to the position designated by the electronic pen and detected via the position detection circuit,
a receiver configured to receive a signal transmitted from the wireless transmitter of the electronic pen body, the signal being the instruction from the second position designator of the expansion device, and
a position designator display controller configured to perform control in such a manner that in addition to an image displayed on the display screen of the display, a position designator is displayed as instructed by the expansion device based on the signal received via the receiver,
wherein the first connector part has a recessed structure;
wherein the electronic pen body includes a cylindrical having the first connector formed therein;
wherein the second connector has a protruding structure; and
wherein the expansion device includes a wall that surrounds the second connector,
wherein, when the first connector and the second connector are connected to each other, the cylindrical part and the wall are interlocked with each other and the first connector and the second connector are covered protectively.

8. The position detection system according to claim 7, wherein, in reference to a specific position considered a reference position on a display screen of the display, the position designator display controller of the information processing device performs control to display the position designator on the display screen at a position corresponding to the operation performed on the expansion device.

9. The position detection system according to claim 8, wherein the specific position on the display screen of the display is a predetermined screen position.

10. The position detection system according to claim 8, wherein the specific position on the display screen of the display is where the position designated by the electronic pen is detected to have disappeared by the position detection circuit.

11. A position detection system comprising:
an electronic pen including an electronic pen body and an expansion device;
an information processing device having a position detection circuit configured to detect a position designated by the electronic pen;
an image display device configured to receive image information from the information processing device and perform processing to display an image reflecting the image information;
wherein the electronic pen body includes:
a first position designator configured to transmit a signal to a position detection sensor;
a controller;
a first connector;
an internal power supply configured to be charged from an external power supply via the first connector; and
a wireless transmitter; and
wherein the expansion device includes:
a second position designator configured to designate a position in an area different from an input area of the position detection sensor;
a switch configured to receive an operation performed by a user; and
a second connector,
wherein the electronic pen body and the expansion device are attachable to and detachable from each other via the first connector and the second connector,
wherein, when the electronic pen body and the expansion device are connected to each other, the internal power supply of the electronic pen body is enabled to feed power to the expansion device, the electronic pen body and the expansion device further enabling data to be exchanged therebetween,
wherein, when the switch of the expansion device is operated, the controller performs control to receive an instruction from the second position designator and transmit the instruction via the wireless transmitter of the electronic pen body, and
wherein the information processing device includes:
a display controller configured to generate image information to display the image information on a specific display screen at a position corresponding to the position designated by the electronic pen and detected via the position detection circuit, and supply the image information to the image display device,
a receiver configured to receive a signal transmitted from the wireless transmitter of the electronic pen body, the signal being the instruction from the second position designator of the expansion device, and a position designator display controller configured to generate image information such that in addition to an image displayed on the specific display screen, a position designator is displayed as instructed by the expansion device based on the signal received via the receiver, and supply the image information to the image display device, and the image display device includes a display processor configured to receive the image information from the information processing device and perform processing to display an image reflecting the image information on the specific display screen, wherein the first connector has a recessed structure;

wherein the electronic pen body includes a cylindrical part having the first connector formed therein;

wherein the second connector has a protruding structure; and wherein the expansion device includes a wall that surrounds the second connector, and wherein, when the first connector and the second connector are connected to each other, the cylindrical body and the wall are interlocked with each other and the first connector and the second connector are covered protectively.

* * * * *